US009365786B2

(12) United States Patent
Anderson et al.

(10) Patent No.: US 9,365,786 B2
(45) Date of Patent: Jun. 14, 2016

(54) FUNCTIONALLY COATED NON-OXIDIZED PARTICLES AND METHODS FOR MAKING THE SAME

(75) Inventors: Scott L. Anderson, Salt Lake City, UT (US); Brian R. Van Devener, Salt Lake City, UT (US); Jesus Paulo L. Perez, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 13/278,886

(22) Filed: Oct. 21, 2011

(65) Prior Publication Data

US 2012/0270050 A1 Oct. 25, 2012

Related U.S. Application Data

(63) Continuation of application No. PCT/US2010/032288, filed on Apr. 23, 2010.

(60) Provisional application No. 61/172,141, filed on Apr. 23, 2009.

(51) Int. Cl.
*B32B 15/02* (2006.01)
*B32B 27/14* (2006.01)
(Continued)

(52) U.S. Cl.
CPC ............... *C10L 9/10* (2013.01); *B22F 1/0018* (2013.01); *B22F 1/0062* (2013.01); *B22F 1/02* (2013.01);
(Continued)

(58) Field of Classification Search
CPC ..... Y02E 60/122; Y02E 60/50; Y02E 60/527; H01M 4/52; B22F 2999/00; B22F 1/0018; B22F 9/082; B22F 1/0088; B22F 2998/10; B22F 1/0044; B22F 1/0062; B22F 2201/00; B22F 2201/03; B22F 2201/10
USPC .................... 428/402–402.24, 403, 404, 407; 427/212, 220, 389.9, 213.3–213.36, 427/483, 256; 264/534, 41, 4–4.7; 252/500, 252/518.1, 519.52; 502/202, 300, 304, 325; 424/179.1, 641, 400, 408, 450, 451, 424/455, 93.7, 184.1, 497, 489, 501, 490, 424/491, 492, 493, 494, 495; 95/133, 142, 95/143; 149/6, 8, 21, 87, 114
See application file for complete search history.

(56) References Cited

U.S. PATENT DOCUMENTS 3,890,166 A * 6/1975 Kondis .......................... 148/248
3,964,939 A   6/1976 Chandross et al.
(Continued)

FOREIGN PATENT DOCUMENTS

JP     2007-223030     9/2007
WO   WO 2006/025627   3/2006
(Continued)

OTHER PUBLICATIONS

Bunker et al.; Low-temperature stability and high-temperature reactivity of iron-based core shell nanoparticles; Journal of the American Chemical Society; Aug. 2004; pp. 10852-10853; vol. 126; ACS Publishing.
(Continued)

*Primary Examiner* — Ling Choi
*Assistant Examiner* — S. Camilla Pourbohloul
(74) *Attorney, Agent, or Firm* — Thorpe North & Western, LLP

(57) ABSTRACT

Air-stable coated particles which include an oxidizable core having an organic ligand coating substantially encompassing the oxidizable core, are disclosed and described. The coated particles can also be substantially free of an oxide layer, especially oxide layers around the oxidizable core. As such, the organic ligand coating acts as a protective or passivating coating. The air-stable coated particles can be formed via a particle size-reduction process. An oxidizable particulate can be crushed and contacted with an organic ligand. The process conditions are maintained such that an oxide layer is pre-empted from forming on the oxidizable core. Such materials can be effective as high energy density additives for various fuels, pyrotechnic, ionic liquids, and rocket propellant applications and for biomedical applications.

13 Claims, 7 Drawing Sheets

(51) Int. Cl.
  *C10L 9/10* (2006.01)
  *B22F 1/00* (2006.01)
  *B22F 1/02* (2006.01)
  *B22F 9/04* (2006.01)
  *B82Y 30/00* (2011.01)

(52) U.S. Cl.
  CPC . *B22F 9/04* (2013.01); *B82Y 30/00* (2013.01); *Y02E 50/30* (2013.01); *Y10T 428/2989* (2015.01); *Y10T 428/2991* (2015.01); *Y10T 428/2993* (2015.01); *Y10T 428/2998* (2015.01)

(56) References Cited

U.S. PATENT DOCUMENTS

| | | | |
|---|---|---|---|
| 4,877,649 | A | 10/1989 | Trowbridge et al. |
| 7,635,461 | B2 | 12/2009 | Anderson |
| 7,850,870 | B2 * | 12/2010 | Ahn et al. ............ 252/500 |
| 2006/0135359 | A1 * | 6/2006 | Adzic et al. ............ 502/326 |
| 2007/0056212 | A1 | 3/2007 | Fink |
| 2008/0089836 | A1 * | 4/2008 | Hainfeld ............ 424/1.11 |
| 2010/0261029 | A1 | 10/2010 | Borysenko et al. |

FOREIGN PATENT DOCUMENTS

| | | |
|---|---|---|
| WO | WO 2007/095058 | 8/2007 |
| WO | WO 2007/120756 | 10/2007 |

OTHER PUBLICATIONS

Chiu et al.; Bond Analysis of Coated Boron Powder; in KUO (ed.) Combustion of Boron-Based Solid Propellants and Solid Fuels (section on Processing Technology and Chemical Kinetics of Boron Particles and Boron-Based Solid Fuels); Mar. 1991; pp. 181-189; Begell House (also in International Journal of Energetic Materials and Chemical Propulsion; 1993; pp. 181-189; vol. 2, Issue 1-6; Begell House).

Dias et al.; Solubility of oxygen in n-hexane and in n-perfluorohexane. Experimental determination and prediction by molecular simulation; Physical Chemistry Chemical Physics.; Jan. 2003; pp. 543-549; vol. 5, Issue 3; Royal Society of Chemistry.

Dukek; Aircraft Fuels; in BISIO (ed.) Encyclopedia of Energy Technology and the Environment; Apr. 1995; pp. 247-260; vol. 1; John Wiley and Sons, Inc., New York.

Eberhardt; Fuels of the Future for Cars and Trucks; Presentation in 2002 Diesel Engine Emissions Reduction (DEER) Workshop; Aug. 2002; 25 pages; 2002 Diesel Engine Emissions Reduction (DEER) Workshop; Aug. 25-29, 2002; San Diego, California.

Fernando et al; Sonochemically Assisted Thermal Decomposition of Alane N, N-Dimethylethylamine with Titanium (IV) Isopropoxide in the Presence of Oleic Acid to Yield Air-Stable and Size Selective Aluminum core—Shell Nanoparticles; Journal of Physical Chemistry C; Dec. 2009; pp. 500-503; vol. 113, No. 2; American Chemical Society.

Guinn et al.; Quantitative chemical topography of polycrystalline Si anisotopically etched in Cl2/O2 high density plasmas; Journal of Vacuum Science & Technology, B: Microelectronics and Nanometer Structures; Mar. 1995; pp. 214-226; vol. 13, Issue 2; IEEE.

Gunter et al.; Thickness determination of uniform overlayers on rough substrates by angle-dependent XPS; Applied Surface Science; May 1995; pp. 69-76; vol. 89, Issue 1; Elsevier BV.

Hanna et al.; A study of oleic acid and 2,4-DHB acid aerosols using an IR-VUV-ITMS: insights into the strengths and weaknesses of the technique; Physical Chemistry Chemical Physics; Sep. 2009; pp. 7963-7975; vol. 11; Royal Society of Chemistry.

Kappen et al.; Overlayer thickness determination by angular dependent x-ray photoelectron spectroscopy (ADXPS) of rough surfaces with a spherical topography; Surface Science; pp. 40-50; vol. 465, No. 1-2; Elsevier BV.

Kim et al.; Chemical vapor deposition of boron and boron nitride from decaborane (14)a); Journal of Vacuum Science and Technology A; Jul./Aug. 1989; pp. 2796-2799; vol. 7, No. 4; American Vacuum Society.

Kim; High energy pulsed plasma arc synthesis and materials characteristics of nanosized aluminum powder; Metals and Materials International; Dec. 18, 2008; pp. 707-711; vol. 14, No. 6; Springer International Publishing AG.

Kiss et al.; Segregation of boron and its reaction with oxygen on RH; Applied Surface Science; Jan. 1989; pp. 95-110; vol. 37, Issue 1; Elsevier BV.

Kuo et al.; Potential usage of energetic nano-sized powders for combustion and rocket propulsion (abstract); Materials Research Society Symposium Proceedings; Dec. 2003; pp. 3-14 (abstract 2 pages); vol. 800; Materials Research Society.

Martin-Concepcion et al.; Surface roughness and island formation effects in ARXPS quantification; Surface and Interface Analysis; Aug. 2004; pp. 788-792; vol. 36, No. 8; John Wiley & Sons, Ltd.

Moulder et al.; Handbook of X-Ray Photoelectron Spectroscopy; Oct. 1992; 261 pages; Perkin-Elmer Corporation, Eden Prairie, Minnesota.

Petersen et al.; Boron nanoparticles inhibit tumor growth by boron neutron capture therapy in the murine B16-OVA model; Anticancer Research; Mar.-Apr. 2008; p. 571; vol. 28; The International Institute of Anticancer Research.

Pickering et al.; Room temperature synthesis of surface-functionalised boron nanoparticles; Chemical Communications; Feb. 2007; pp. 580-582; Issue 6; Royal Society of Chemistry.

Powell; Elemental binding energies for X-ray photoelectron spectroscopy; Applied Surface Science; Jun. 1995; pp. 141-149; vol. 89, Issue 2; Elsevier BV.

Risha et al; Chapter 10, Metals, energetic additives and special binders used in solid fuels for hybrid rockets; in KUO et al. (eds.) Fundamentals of Hybrid Rocket Combustion and Propulsion; Mar. 2007; pp. 413-456; Progress in Astronautics and Aeronautics series Book 218; The American Institute of Aeronautics and Astronautics.

Risha et al.; Characterization of nano-sized particles for propulsion applications (abstract); Materials Research Society Symposium Proceedings; Dec. 2003; p. 243-254 (abstract 2 pages); vol. 800; Cambridge University Press.

Rosenman et al.; HLA Class II DPB1 and DRB1 polymorphisms associated with genetic susceptibility to beryllium toxicity; Occupational and Environmental Medicine; Jul. 2011; pp. 487-493; vol. 68; BMJ Publishing Group Limited.

Schaffer et al.; The influence of collision energy and strain accumulation on the kinetics of mechanical alloying; Journal of Materials Science; Jan. 1997; pp. 3157-3162; vol. 32, Issue 12; Springer International Publishing AG.

Shafi et al.; Sonochemical Synthesis of Functionalized Amorphous Iron Oxide Nanoparticles; Langmuir; Jul. 2001; pp. 5093-5097; vol. 17; American Chemical Society.

Sheng et al.; A quantitative XPS study of spherically shaped powders coated with an overlayer; Surface Science; Aug. 1994; pp. 325-350; vol. 314, Issue 3; Elsevier BV.

Shyu et al.; Combustion Characteristics of GAP-Coated Boron Particles and the Fuel-Rich Solid Propellant; Combustion and Flame; Mar. 1995; pp. 634-644; vol. 100, No. 4; Elsevier BV.

Slutsky et al.; Synthesis of Small-Scale Boron-Rich Nano-Size Particles; Propellants, Explosives, Pyrotechnics; Sep. 2005; pp. 303-309; vol. 30 No. 4; John Wiley & Sons.

Suryanarayana; Mechanical alloying and milling; Progress in Materials Science; Jan. 2001; pp. 1-184; vol. 46, Issues 1 -2; Elsevier B.V.

Thompson et al.; X-Ray Data Booklet; Jan. 2001; 457 pages; Lawrence Berkeley National Laboratory, University of California, Berkeley, California.

(56) References Cited

OTHER PUBLICATIONS

Van Devener et al.; Air-stable, Unoxidized, Hydrocarbon-dispersible boron nanoparticles; Journal of Materials Research; Nov. 2009; vol. 24, Issue 11; pp. 3462-3464; Cambridge Univeristy Press.

Van Devener et al.; Oxide-Free, Catalyst Coated, Fuel-Soluble, Air-Stable Boron Nanopowder as Combined Combustion Catalyst and High Energy Density Fuel; Energy and Fuels; Oct. 2009; pp. 6111-6120; vol. 23, No. 12; American Chemical Society.

Wu et al.; Combustion Efficiency and pyrochemical properties of micron-sized metal particles as the components of modified double-based propellant; Acta Astronautica; Apr.-May 2011; pp. 1098-1112; vol. 68; Issues 7-8; Elsevier BV.

Xu et al.; Crystalline Boron Nanoribbons: Synthesis and Characterization; Nano Letters; Apr. 2004; pp. 963-968; vol. 4, No. 5; American Chemical Society.

Yinghuai et al.; Boron-based nanostructures: precursors to modern materials; Polymer Preprints; 2008; pp. 857-858; vol. 49, No. 2; American Chemical Society, Division of Polymer Chemistry.

Young et al.; Preparation and Proerties of $Mg(B_{1-x}C_x)_2$ Using Carbon Chemical Vapor Coated Boron; IEEE Transaction on Applied Superconductivity; Jun. 2007; 4 pages; vol. 17, No. 2; University of Southampton.

PCT Application PCT/US2010/032288; filed Apr. 23, 2010; University of Utah Research Foundation et al.; International Search Report mailed Jan. 17, 2011.

* cited by examiner

US 9,365,786 B2

FUNCTIONALLY COATED NON-OXIDIZED PARTICLES AND METHODS FOR MAKING THE SAME

RELATED APPLICATION

This application is a continuation of International Application No. PCT/US10/32288, filed on Apr. 23, 2010 which claims the benefit of U.S. Provisional Application No. 61/172,141, filed Apr. 23, 2009, both of which are incorporated herein by reference.

GOVERNMENT INTEREST

This invention was made with government support under N00173072C005 and N000140810345 awarded by Office of Naval Research. The United States government has certain rights to this invention.

BACKGROUND

Boron has a volumetric heat of combustion (i.e., energy density) more than three times that of the best practical hydrocarbon fuels, and is one of the few materials where both volumetric and gravimetric energy densities are well above those for hydrocarbons. For this reason, there has been research for decades aimed at using boron or boron-rich materials as a fuel or fuel additive in liquid or solid-fueled propulsion systems. Boron's potential as a fuel has not, to date, been realized, partly due to the difficulty in igniting and burning it efficiently. One problem is that boron is quite refractory ($T_{vap}$=2800K), thus combustion depends on heterogeneous reactions, which tend to be slow and diffusion limited. This limitation can be mitigated, at least in principle, by using nanoparticulate boron, leading to large surface-area-to-volume ratios, as suggested by a number of previous researchers. A limitation to this approach is that boron exposed to air forms a passivating native oxide layer that inhibits oxidation. Furthermore, as the particle size decreases, this oxide makes up an increasing fraction of the particle mass, and thus reduces the energy density.

There have been a number of previous reports of boron nanoparticle production using methods such as gas phase pyrolysis of diborane or solution-based synthesis routes that involve several steps. There also have been several approaches reported to coating boron particles with passivating overlayers, aimed at preventing air-oxidation, and thus enhancing ignition and combustion. Glycidyl azide polymer (GAP) has been used to coat boron particles. However it was shown in these studies that the GAP coating interacts with the boron through its native surface oxide layer; the boron particles used were already oxidized. Slurry fuels have been produced containing liquid hydrocarbon based fuels, boron and a fluoropolymer. In some cases they also included polyolefin amide alkeneamine surfactant in the slurry. In each case, the surfaces have an oxide layer that interacts with the surfactants.

SUMMARY

In light of the problems and deficiencies noted above, air-stable coated particles which include an oxidizable core having an organic ligand coating substantially encompassing the oxidizable core are disclosed. The coated particles can also be substantially free of an oxide layer, especially oxide layers around the oxidizable core. As such, the organic ligand coating acts as a protective or passivating coating.

The air-stable coated particles can be formed via a particle size reduction process. In particular, an oxidizable particulate can be crushed in the presence of an organic ligand in a non-oxidizing environment. The air-stable coated particles can be incorporated into a variety of materials, e.g. pyrotechnics and biomedical applications. With the addition of the coated particles dispersed in such materials an enhanced fuel can be formed with increase energy release per weight of the fuel.

In addition to a passivating effect of the ligand coating, by varying the organic ligand, the dispersability of the particles in different media can be adjusted. For example, if an organic ligand is used that has a hydrocarbon "tail" that is exposed on the particle surface, this enhances dispersability in hydrocarbons (e.g. fuels). If a ligand is used that exposes polar functional groups on the particle surface, then dispersability is enhanced for polar media (e.g. aqueous dispersions, polar binders).

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

The present invention will become more fully apparent from the following description and appended claims, taken in conjunction with the accompanying drawings. It is to be understood that these drawings merely depict exemplary embodiments of the present invention and they are, therefore, not to be considered limiting of its scope. It will be readily appreciated that the components of the present invention, as generally described and illustrated in the figures herein, could be arranged, sized, and designed in a wide variety of different configurations. Nonetheless, the invention will be described and explained with additional specificity and detail through the use of the accompanying drawings in which:

DETAILED DESCRIPTION

Figure 1A:
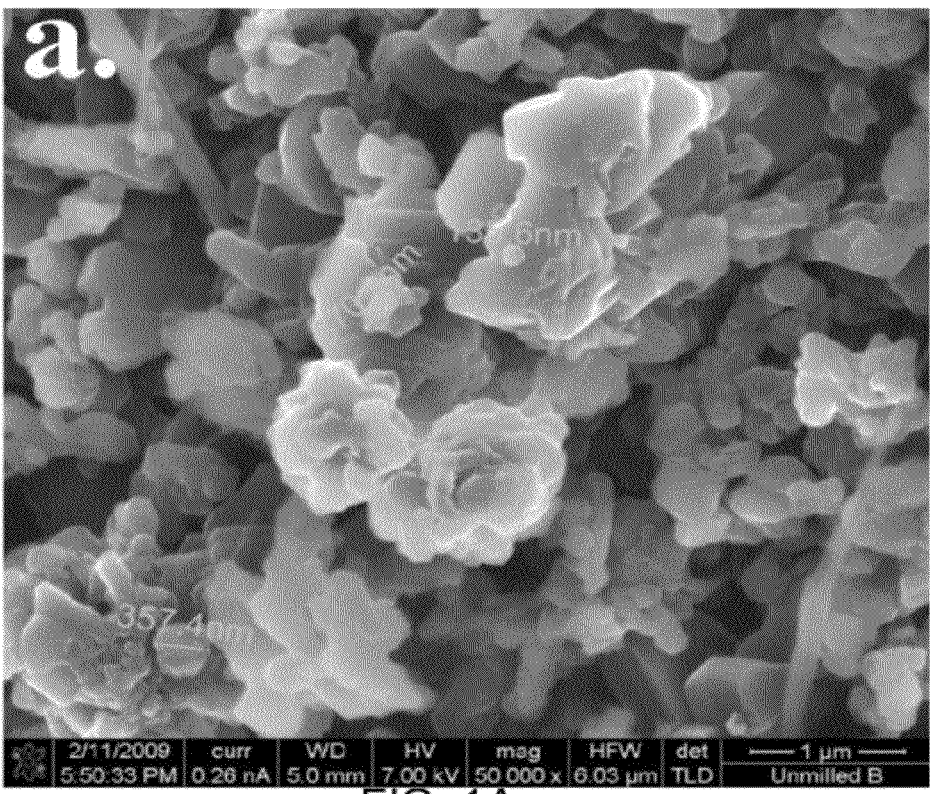
FIG. 1A-1D are SEM images at 50 k times magnification, 1 μm scale bar: (a) un-milled boron feedstock; (b) dry milled boron; (c) boron wet milled in hexanes; and (d) boron wet milled with oleic acid surfactant.
Figure 1B:
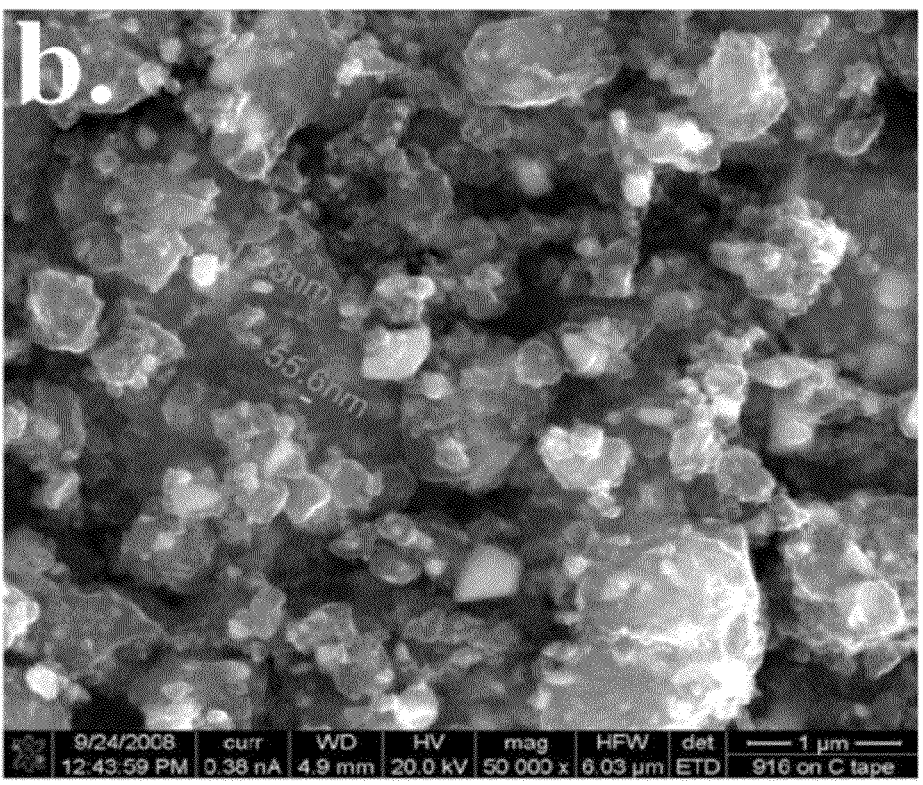
Figure 1C:
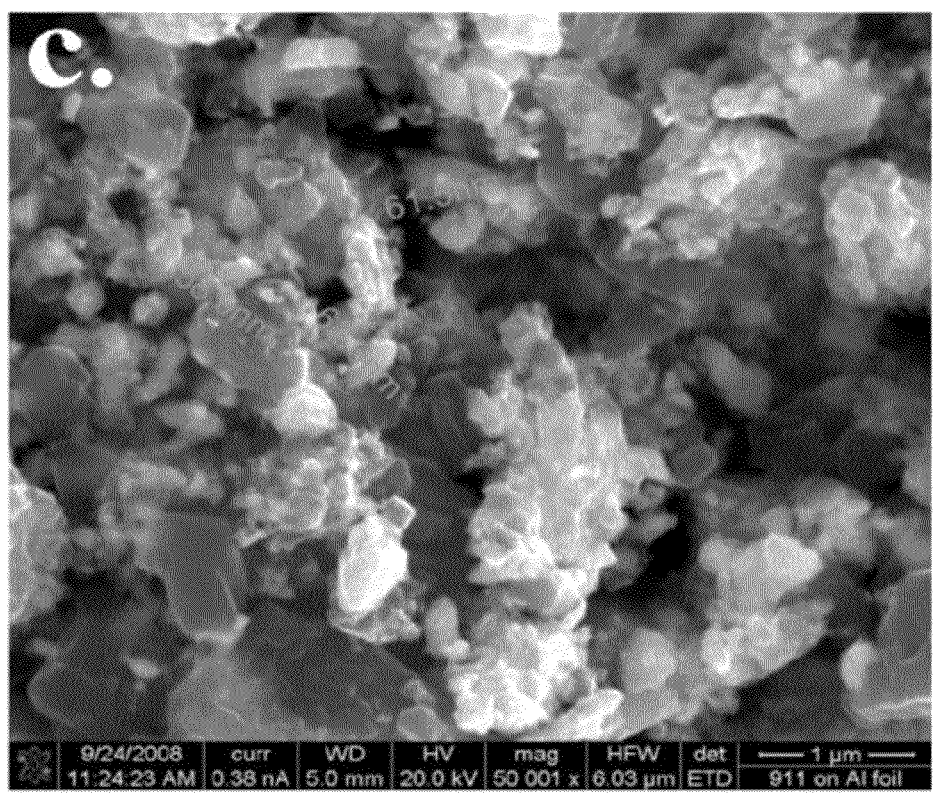
Figure 1D:
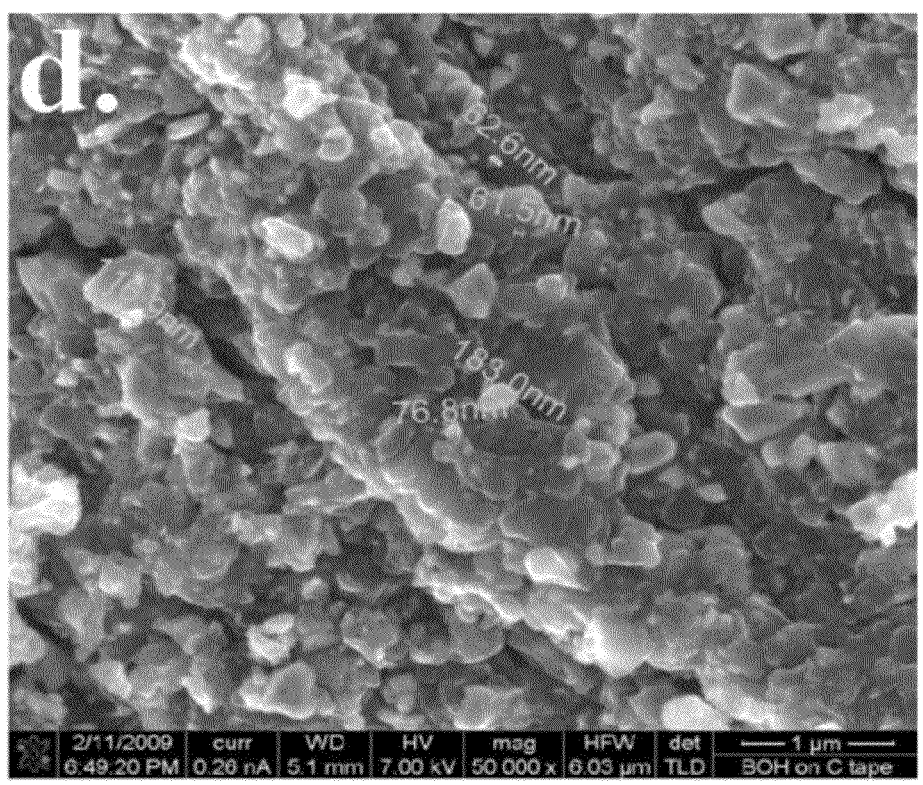

The following detailed description of exemplary embodiments makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes may be made without departing from the spirit and scope of the present invention. Thus, the following more detailed description is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention.

DEFINITIONS

In describing and claiming the present invention, the following terminology will be used.

The singular forms "a," "an," and "the" include plural referents unless the context clearly dictates otherwise. Thus, for example, reference to "a nanoparticle" includes reference to one or more of such materials and reference to "crushing" refers to one or more such steps.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "air-stable" refers to a material which is not quickly oxidized upon exposure to air or oxygen. Although some air-stable materials are stable indefinitely, most will have an extended stability of several hours to weeks. The core materials in the particles tend to oxidize within several seconds to several minutes of exposure to air, sometimes explosively, depending on the particle size, if not protected by a passivating layer. In contrast, an air-stable material is one which does not immediately oxidize but has an extended air stability.

As used herein, "encompass" refers to surrounding a particle although a continuous layer is not required. In many cases the organic ligand coating will be substantially continuous; however, this is not required as long as oxidizing species are blocked from contacting the oxidizable core.

As used herein, "nanoparticle" refers to a particle having a size less than 1 µm and generally less than about 500 nm.

As used herein, "rich" is a modifier used in associated with an element such as, but not limited to, boron or aluminum, to indicate such an element is the dominant component. For example, a material which is boron rich has a dominant portion of boron, e.g. greater than 50 atom %.

As used herein, "soluble" and "solution" refer to either a true solution of one molecule in a solvent of a different molecule, or to a stable suspension or dispersion of particles in a solvent or other media. An example of the first scenario is a solution of oleic acid in hexanes. This use of "soluble" and "solution" follows the conventional definition of a homogeneous mixture of one material with another. An example of the second scenario is a solution of nanometer boron particles in hexanes. This use of "soluble" and "solution" follow common use in the colloidal nanoparticle field, where the meaning is more akin to forming a stable suspension or dispersion of particles of one material in a solvent.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Air-Stable Coated Particles

Air-stable coated particles which include an oxidizable core having an organic ligand coating substantially encompassing the oxidizable core are disclosed. The oxidizable core can comprise an oxidizable material. The coated particles can also be substantially free of an oxide layer, especially oxide layers around the oxidizable core. As such, the organic ligand coating acts as a protective or passivating coating.

The oxidizable core can be formed of almost any oxidizable material. Non-limiting examples of such materials can include boron, aluminum, magnesium, silicon, titanium, germanium, bismuth, compounds thereof, mixtures thereof, and the like. However, of particular interest are high energy density materials such as boron, aluminum, magnesium, and compounds thereof, such as boron carbide, or materials (e.g. aluminum, magnesium, bismuth or other metals) that might be added to modify combustion or optical emission properties. In one specific aspect, the oxidizable core consists essentially of boron. In another aspect, the oxidizable core can comprise a boron rich compound such as boron carbide or boron nitride. In one specific aspect, the oxidizable core can comprise an aluminum rich compound such as aluminum carbide.

Although the core can be almost any size, for combustion particle diameters less than about 5 micrometer such as from about 10 nm to about 500 nm can be suitable. In some aspects, the core can be micron sized, e.g. about 1 µm to about 5 µm, although in other aspects the particles can be nanoparticles. Diameters from about 10 nm to about 200 nm can be particularly useful when the coated nanoparticles are used as additives to jet fuels or in solid propellants.

The organic ligand coating can be formed of a wide variety of compounds which can be attached to the oxidizable core (and optionally catalyst material bonded thereto). Although not always required, the organic ligand can typically be covalently attached to the oxidizable core. In one aspect, the organic ligand coating can be non-polar. Further, it is often desirable for the organic ligand coating to provide for solubility in a particular fuel composition, whether a liquid or solid fuel. For example, the organic ligand can have a hydrophobic moiety on a free end such that the coated particles are soluble in hydrocarbon solvents and/or fuels. Although other organic ligands can be suitable, non-limiting examples can include oleic acid, stearic acid, maleic acid, linoleic acid, behenic acid, sodium dodecyl sulfate, alkyl amines, tri-octyl phosphate, and combinations thereof. In one aspect, the organic ligand is oleic acid. In another aspect, the organic ligand can be a fluorocarbon ligand. Fluorocarbon compounds can be desirable in order to reduce or eliminate formation of hydrogen-boron compounds such as HOBO during combustion so as to strongly favor formation of $B_2O_3$ and boron fluoride compounds which result in a higher combustion energy. Thus, in one specific aspect, the organic ligand can be perfluorotetradecanoic acid or perfluorooleic acid. The use of perfluoro or highly fluorinated compounds can be particularly suitable for use with solid propellants. Alternatively, the organic ligand coating can be polar. Such polar ligands can provide for solubility in polar materials such as, but not limited to, water, ionic liquids, polymers and/or polar solvents. Non-limiting examples of suitable polar ligands can include organic amines, alcohols, nitriles, amides, sulfonates, ionic liquids and combinations or polymers thereof. In one aspect, the coated particles can be dispersible in rocket propellants. As such, solubility in propellant binders (e.g. PE, GAP, PU, PPG, etc) can often be desirable.

In some aspects, it can be desirable to include a catalyst material with the oxidizable material. Such catalyst material can be provided as a distinct particulate material dispersed within a fuel. However, in some cases it can also be beneficial to incorporate the catalyst material into the coated particle. Thus, in one specific aspect, the particle can include at least one combustion catalyst island on the oxidizable core between the organic ligand and the oxidizable core. Typically, during formation the catalyst material can attach or deposit onto the outer surface of the oxidizable core in discrete islands. The organic ligand coating then encompasses and surrounds both the core and the attached catalyst islands. Non-limiting examples of suitable combustion catalyst include cerium oxide, palladium oxide, tin oxide, manganese oxide, yttrium oxide, iron oxide, cobalt oxide, palladium, platinum, nickel, other metals or rare earths, and composites, intermetallics, alloys thereof, and combinations thereof. In one aspect, the combustion catalyst is cerium oxide. Other surface chemistry modifiers can also be used such as, but not limited to, alkali, alkaline earth metals.

The air-stable coated particles can be formed via a particle size reduction process. In particular, an oxidizable particulate can be crushed in the presence of an organic ligand. In one embodiment, the ligand molecule has one or more functional groups that tend to react and bond with the surface of the particle material. The crushing process is performed in a nitrogen or other inert atmosphere to give the organic ligand a chance to bond to, and coat the surfaces before they are exposed to air or other oxidizing environment. In other cases, particularly when it is desired to cap the particles with a ligand that exposes functional groups on the exterior that might tend to react with the particle surface, a two step capping process may be used. In such a process, the particles are crushed in the presence of one ligand, and then the capped particles are further coated or capped by a second ligand that is chemically grafted or bonded to the first ligand. Another option is a dative covalent bonding where both electrons forming the bond comes from a single atom in the ligand, e.g. nitrogen. When the ligand coated particles are subsequently exposed to air, they do not oxidize. The oxidizable particulate is comminuted sufficient to form particulate oxidizable core which is substantially coated by the organic ligand to form the air-stable coated particles. The process conditions are maintained such that the organic ligand substantially preempts formation of an oxide layer on the oxidizable core. The presence of the organic ligand and an optional wetting agent prevents oxygen contact with newly fractured particles. Thus, as the crushing occurs, fresh non-oxidized surfaces are exposed and immediately contacted with the organic ligand and/or wetting agent rather than undesired oxygen or oxygen-containing compounds. As a result, substantially the only oxide in the particles are the native oxide from surfaces of the original uncrushed particle which typically makes up a small fraction of the core surfaces (e.g. typically less than about 5%, and in some cases less than about 0.1%, depending on the degree of crushing involved). For example, a 10 μm starting particle with a native oxide layer crushed to 100 nm results in a diameter reduction factor of 100, and a surface area reduction of 10,000. Some small degree of native oxide is typically present and often unavoidable. However, the amount of such native oxide is substantially smaller than that which would form on unprotected particles, and may be undetectable by XPS.

The crushing can be accomplished using any method which reduces the particle size while allowing for simultaneous contact with the organic ligand. Alternatively, crushing can be performed under a non-oxidizing environment (e.g. solvent or inert gas) and the crushed material subsequently placed in contact with the ligand. Non-limiting examples of suitable crushing techniques include ball milling, planar milling, roll milling, ultrasonic milling, or combinations thereof. In one aspect, the step of crushing is accomplished by ball milling. Milling can be done as a wet process or dry process. In one specific aspect, the step of crushing is a wet milling process which involves using a wetting agent in which the organic ligand is substantially soluble. The wetting agent can have a multi-purpose of solubilizing the organic liquid and acting as a carrier, as well as providing a medium to prevent agglomeration or caking of the milled particles, and provide a barrier to oxygen-containing compounds while the organic liquid is coating the crushed particles. Generally, the wetting agent can be free of oxygen or at least free of reactive oxygen which could form oxide at the core surface. Although not required it can be beneficial to chose a wetting agent which has the same composition as an intended final liquid product, e.g. jet fuel. This can eliminate the need for later cleaning or solvent removal processes. Non-limiting examples of suitable wetting agents can include organic molecules that do not have substituents that might react with the core material, such as hexane, jet fuel, dodecane, straight chain and branched alkanes and alkenes, short and long chain nitriles, aromatic molecules with no reactive substituents, acrylonitrile, amines, and the like.

Regardless of the specific crushing approach, in each case the starting material is substantially larger than the final oxidizable core size. Thus, the coated particles are formed by size reduction rather than by deposition or assembly processes. In one aspect, the oxidizable particulate has an average starting diameter from about 500 nm to about 1.5 μm. Although other ranges can be suitable, the step of crushing can in some cases be sufficient to form coated particles having an average diameter from about 30 nm to about 100 nm. At large scale production for example, an oxidized boron starting powder greater than 10 microns can be used so that the oxide coverage deriving from the native oxide coating on the starting powder would be <0.1% in the final nanopowder. However, specific starting materials can be varied and optimized for particular processing equipment and final product specifications. Typically, any native oxide layer is only a few nm thick.

As previously indicated, a combustion catalyst can be optionally integrated into the particle. This can be accomplished by including a particulate combustion catalyst during crushing. Alternatively, the combustion catalyst can be dry or wet milled with the oxidizable core material. Such milling allows the catalyst to deposit and adhere to outer surfaces of the core material to form a composite particulate. Subsequent crushing in contact with the ligand allows the ligand to coat around the composite particulates. In this manner, the composite particle is formed having at least one combustion catalyst island on the oxidizable core between the oxidizable core and the organic ligand. This same intermediate milling can be used with other surface modifiers prior to contact with the ligand material.

Depending on the purity and composition of the starting materials, milling equipment, and process conditions additional purification steps can be optionally applied to the coated particles to remove undesired elements. The desired degree of purity will, of course, depend on the intended application. For example, a high performance, high energy density jet fuel may require substantially no impurities while flare or other pyrotechnic applications can tolerate more impurities. Purifying can involve the use of magnetic cleaning to remove magnetic impurities, e.g. particles of Fe or tungsten carbide from milling media, etc. Similarly, washing and drying can be used to remove excess wetting agent, excess organic ligands, and the like. Sedimentation can also be used to allow aggregates to settle from suspended particulates and solvent and/or wetting agent. An initial milling followed by separation may be used to remove surface contaminants, including native oxide, from the surface of contaminated or oxidized starting material. In one alternative, low-quality contaminated boron or other core material can be milled in the presence of a solvent and ligand. Many contaminants are soluble in hexane or other solvents under these conditions such that the milling and contact with the ligand can often also result in removal of impurities from the starting particulate materials.

The air-stable coated particles can be incorporated into a variety of fuel or pyrotechnic materials. With the addition of the coated particles dispersed in such materials an enhanced fuel can be formed with increased energy release per weight of the fuel. Non-limiting examples of such materials can include jet fuels, flares, solid propellants, liquid rocket fuels, and the like. In one aspect, the fuel is jet fuel. In another aspect, the fuel is a solid propellant. Other applications for these air-stable coated particles can include neutron capture therapy (e.g. using $B^{10}$ tagged with a tumor binding ligand).

Example 1

Oleic Acid Coated Boron

Elemental boron has one of the highest volumetric heats of combustion known (~136 MJ/liter) which is almost twice that of aluminum (~81 MJ/liter) and three to four times that of typical jet fuels (~34-39 MJ/liter), and is therefore of interest as a high energy density fuel. Combustion of boron is inherently a heterogeneous process, due to the high vaporization temperature, and the presence of a native oxide layer which significantly inhibits combustion.

A simple one-step process for generating air-stable boron nanoparticles that are largely un-oxidized, and also soluble in hydrocarbons is described in a particular example as follows. Ball milling can be used to produce ~50 nm particles that are capped with oleic acid ligands. Scanning electron microscopy (SEM) and dynamic light scattering (DLS) were used to investigate size distributions, with X-ray photoelectron spectroscopy (XPS) verifying the protective role of the oleic acid ligand. The process is fast, inexpensive, and easily scalable to large volume production.

This approach allows production of air-stable boron nanoparticles with controlled size, and with no detectable boron oxide layer. Practical preparation methods for propulsion fuels must generate materials on large scales, and at low cost. This method is based on high energy ball milling, and is simple, inexpensive, and easily scalable to large batches as needed. In one step, micron scale boron power is crushed to nano-scale powder, rendered air-stable by an organic ligand coating, and rendered dispersible in hydrocarbons. The latter property is relevant to use of the particles as additives to conventional liquid fuels, and can be helpful in blending solid propellants or pyrotechnics, as well. By changing surfactants (e.g. organic ligands), the method can be applicable to a wide variety of materials, and to aqueous solutions for biological applications, such as boron neutron capture therapy.

Experimental Methods

Commercially obtained boron (Sigma-Aldrich, average diameter 800 nm) was used as raw feedstock for milling, which was carried out in a Spex-CertiPrep® 8000M mixer mill using both stainless steel and tungsten carbide milling jars, and ⅛" diameter balls of either tungsten carbide or stainless steel. The charge ratio (ratio of ball to powder mass) was kept high at 80:1. This helped facilitate shorter milling times by increasing the number of collisions per unit time and allowing for more energy transfer to break up particles. During a typical milling, 2 g of boron was loaded into a 37 cm³ milling jar. In some experiments the powder was milled dry, but in most cases, liquid hydrocarbon (JP-5 jet fuel or hexane) was added to the milling mixture. The milling jars used were modified from the stock geometry to eliminate corners and cracks at the seals where powder might be inaccessible to the milling balls.

The boron was kept in a nitrogen atmosphere before, during, and after milling. No evidence of boron nitride formation was observed. In most experiments the milled nanopowder was brought into contact with air prior to analysis in order to observe air-stability. It should be emphasized that caution must be exercised when exposing freshly milled unpassivated boron nanoparticles to air because small particles can be pyrophoric, i.e., air oxidation can lead to thermal runaway and particle ignition. Auto-ignition of dry, sub-50 nm particles in air, and detonation was observed when a small sample of such particles was exposed to pure $O_2$. Ligand-protected particles are air-stable, as shown below, but for safety all milling products were treated as potentially pyrophoric. The particles were slowly exposed to increasing oxygen concentrations, and eventually pure oxygen, to guarantee that they are air-stable. For all wet-milled samples, this was done by bubbling a variable $N_2/O_2$ mixture through a suspension of the particles in hexanes. Some dry-milled particles were treated this way as well, and some were exposed dry.

Most particle production was carried out wet, with ~15 ml of either hexanes or JP-5 jet fuel added to the mix. Wet milling prevents caking of the milled powder, makes sample recovery and clean-up easier, and reduces the milling time for a given particle size by about ~50%. Wet milling can sometimes introduce contaminants into the milled products, mostly coming from the wear of the milling jar and balls by the relatively abrasive boron powder. In dry milling, it has been suggested that the powder tends to coat the milling surfaces early in the milling process, reducing wear on the surfaces that generates contamination. As expected, the harder and denser tungsten carbide milling balls and jar resulted in faster size reduction than stainless steel, which was used in some studies in an effort to determine the source of some contaminants.

To generate ligand-protected boron nanoparticles, 1 mL of oleic acid ($CH_3(CH_2)_7CH=CH(CH_2)_7COOH$—Sigma-Aldrich) was added to the boron/hydrocarbon mixture prior to milling. The idea is that fresh boron surfaces generated by milling, react with the acid end of the oleic acid forming B—O—C bonds, thereby anchoring the hydrocarbon tail to the boron surface. Some experiments were carried out using sodium dodecyl sulfate (SDS) to coat and solubilize the boron particles, with results similar to those with oleic acid. Because detergent surfactants interfere with demulsifying ship-board fuels, and sulfur in fuels is a pollution source, the experiments described below were done with oleic acid as the solubilizing ligand.

The amount of oleic acid used is in excess of that required to coat the nanoparticle surfaces. For fuel uses, this small excess of oleic acid would probably not be significant, however, for the purposes of particle surface characterization, excess oleic acid was removed with the following procedure: After milling, the hydrocarbon (hexanes) in the boron/oleic acid/hydrocarbon mixture was allowed to evaporate. This can be done by slowly introducing oxygen in a bubble reactor to avoid autoignition (e.g. bubbling a variable $N_2/O_2$ mixture through the particles starting with a low oxygen content and ramping up to pure oxygen). Subsequent processing was done is air.

The resulting boron/oleic acid paste was then dispersed in reagent grade methanol (Mallinckrodt, 99.9%), then centrifuged. Free oleic acid is soluble in methanol, and thus left in solution when the particles are centrifuged out. The washed particles are still soluble in hydrocarbon solvent (and JP-5), indicating that they retained the oleic acid coating. The washed particles can be dispersed in hexane or other hydrocarbons by ultrasonication, with mild centrifugation to remove any remaining aggregates. These dispersions are stable for months.

Characterization of particle surfaces was carried out using x-ray photoelectron spectroscopy (XPS), in ultra-high vacuum. For wet-milled samples, a few drops of hydrocarbon solution containing boron or oleic acid-functionalized boron was pipetted onto a stainless steel shim and allowed to evaporate, leaving behind dry boron powder. The process was repeated until a continuous coating was obtained. A continuous coating is important so as not to detect photoelectrons from elements present in the underlying stainless steel. Visual inspection under a light microscope was used to examine the coverage, and complete coverage was verified by the absence of photoelectron peaks from Fe, Cr, and Ni. (Samples milled with stainless steel jars and/or balls showed some contamination from abraded steel, as discussed below) The coated shims were dried in a vacuum oven at 70° C. for two hours to evaporate any remaining volatile hydrocarbons. For samples that were milled with oleic acid, the drying time was increased to 12 or more hours, to drive off any excess oleic acid that remained after the methanol washing process. Aside from a few experiments where samples were transferred in inert atmosphere, all samples were exposed to the ambient atmosphere prior to XPS analysis, and there is substantial additional exposure to atmosphere in the low vacuum (~10 Torr) drying oven.

X-ray photoelectron spectra were collected using the monochromatic Al Kα source (1486.7 eV) on a Kratos Axis Ultra DLD instrument. In order to maintain a reasonable count rate from the detector, the x-ray spot size was kept at 300×700 microns for both the low resolution survey scans, as well as the high resolution scans of energy ranges of interest. All samples showed a strong propensity for charging resulting in peaks shifts, and broadening due to uneven charging. The peak widths were minimized by flooding the sample with low-energy electrons and ions from the instrument's charge neutralizer system, however, there is still ambiguity regarding the absolute peak positions. A common approach to determining the absolute energy shift is to reference the spectra to the C 1s peak from adventitious carbon. For these samples, which have $sp^2$, $sp^3$ and carboxylic carbon from oleic acid, this approach is also ambiguous. To provide an absolute energy reference, a small concentration of argon atoms was implanted into the sample using 1 keV $Ar^+$. The positions of the XPS peaks of interest were then corrected using the shift observed (typically around 0.7 eV) for the Ar 2p peak, relative to its literature value (241.8 eV).[12] The disadvantage of this approach is that some sputter damage to the surface accompanies Ar implantation. The energy corrections estimated by reference to implanted Ar and adventitious carbon differed by no more than 0.4 eV, and were nearly constant for all samples. This discrepancy is not large enough to introduce any ambiguity in peak identification.

Particle size and morphology information were obtained using a combination of dynamic light scattering (DLS) and scanning electron microscopy (SEM). For DLS, a Particle Sizing Systems NICOMP 380 was used, and the particles were suspended in hexane solvent (viscosity=0.294 CP, index of refraction 1.375 at 25° C.). SEM images were obtained on a FEI Nova Nano 600 operated at a beam energy of 20 kV. Samples for SEM were washed in methanol and centrifuged as described, re-dispersed in hexanes by ultra-sonication, pipetted onto aluminum stubs, and oven dried prior to analysis.

Results and Discussion:

Size Distributions:

FIGS. 1A through 1D show four representative SEM images of boron: un-milled, dry-milled, wet-milled in hexanes, and wet-milled in hexanes with oleic acid surfactant. The dry-milled powder was milled for 6 hours, while the wet-milled samples were run for only 3 hours because milling is more efficient. All of the images in FIGS. 1A through 1D for milled material were from samples that were milled with a tungsten carbide (WC) jar and WC balls. All images were collected under the same conditions at 50,000 times magnification. It can be seen that the large sharp edged particles in the un-milled sample are reduced in size and have more rounded shapes. Aggregation of the particles during drying for SEM analysis is extensive, and makes determination of the particle size distribution difficult. In the un-milled boron the particles appear to be primarily in the 500-2000 nm range. For all milled samples, the size distributions are dominated by particles in the sub-150 nm size range, but the appearance of the samples is quite different. The sample milled in hexanes with oleic acid appears to have a narrower distribution of primary particle sizes, and the aggregates look smoother. For the oleic acid-functionalized samples, the particle solubility in hydrocarbons is high, allowing the use of DLS to probe the size distribution of the dispersed primary particles. Stable suspensions of the un-functionalized boron particles was not achieved, thus no further analysis of the size distributions was performed.

Figure 2:
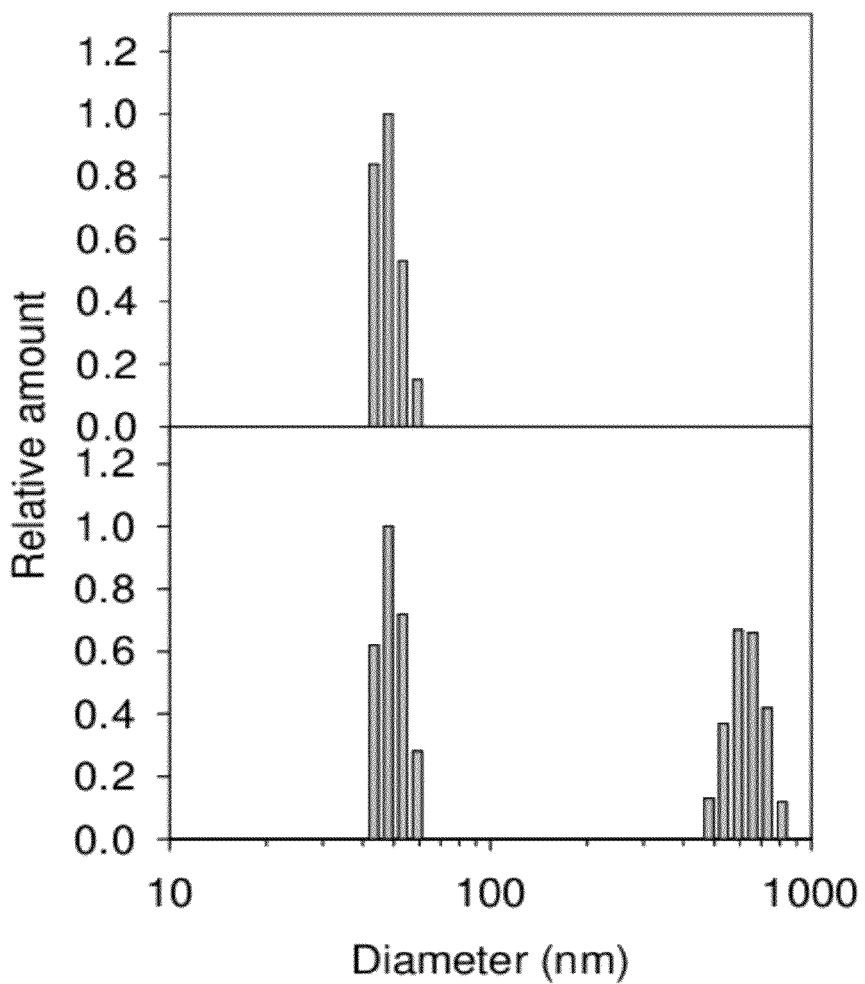
FIG. 2 shows DLS results of oleic acid capped boron. (Top) Number weighted, (bottom) mass weighted.

For DLS, the washed, centrifuged samples were re-suspended in hexane by ultra-sonication prior to analysis. FIG. 2 shows normalized histogram plots of the number- and mass-weighted size distributions for boron particles in hexane. The number-weighed distribution (top frame) is dominated by sub-100 nm particles, with a barely visible peak around 600 nm. Because mass scales with $d^3$, these large particles make up nearly half the mass-weighted distribution (bottom frame). The question is whether these large particles are simply boron feedstock that somehow missed getting broken down in milling, or if they are aggregates of smaller particles that are resistant to breakup during re-suspension for DLS.

The latter interpretation was suggested by experiments where the milling time was increased from the 3 hours used for most wet milling experiments. Longer milling times were found to slightly increase the fraction of the mass distribution in the sub-100 nm range, but at the same time, the size distribution of the large particles increased to 1 μm or more. This shows that milling can build stable aggregates by cold-welding small particles together.

Figure 3:
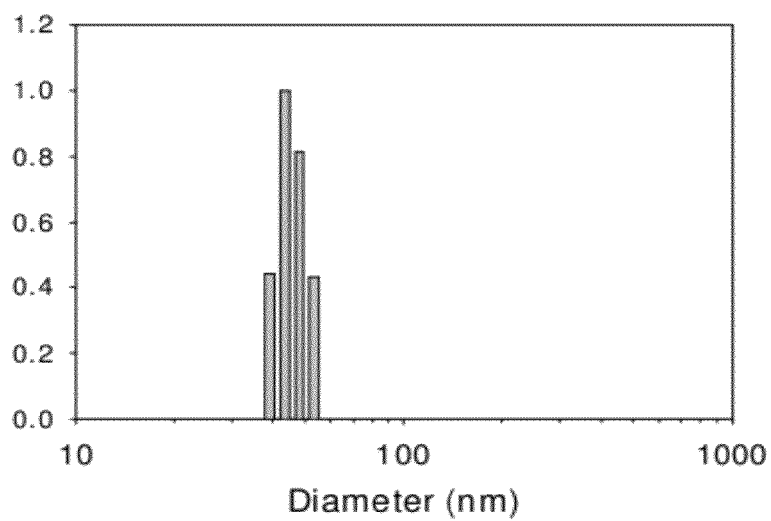
FIG. 3 shows DLS results of oleic acid capped boron following separation.

Regardless of the nature of the large particles, they can easily be removed by sedimentation, either by centrifuging the suspension for 15 minutes, or by simply allowing it to stand undisturbed for a few days. FIG. 3 shows the size distribution obtained after centrifuging the suspension, then analyzing the supernatant fluid. Note that the large particles are all gone, but the size distribution of sub-100 nm particles is essentially identical to that in the original suspension. Once the large particles have sedimented out, the remaining suspension is stable for at least six months. The same is true for boron particle suspensions in JP-5. For large scale production of boron particles, one would presumably recover the large particles for further milling to avoid waste of the boron feedstock.

Figure 4:
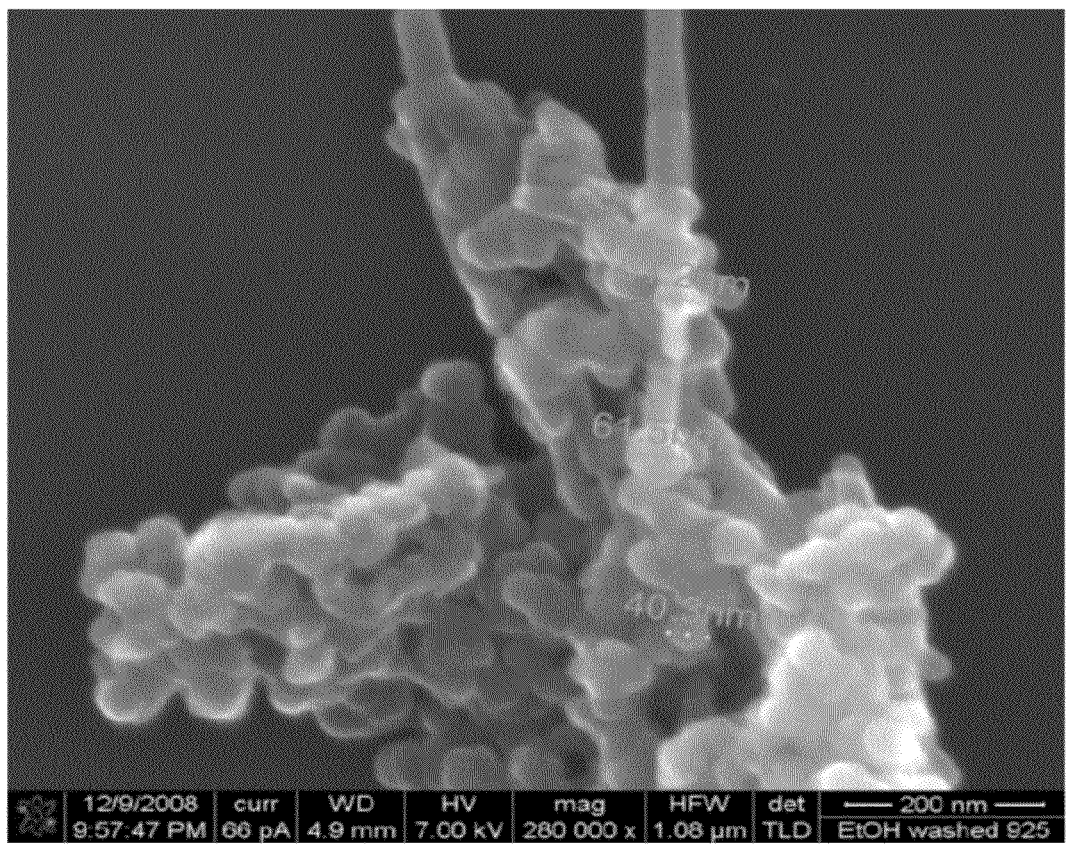
FIG. 4 is an SEM image of oleic acid capped boron following separation.

Because even the small, stably suspended particles aggregate extensively during drying, it is hard to compare the DLS and SEM results. FIG. 4 shows an SEM image of oleic acid-functionalized boron particles taken from the supernatant after centrifugation. To minimize formation of large aggregates during sample drying, the particle suspension was diluted before spotting onto a TEM grid. The particles still aggregate when dried, but this image shows that the primary particle size distribution is relatively narrow with average diameter near ~50 nm (40-60 nm range), and no primary particles larger than 100 nm. This is in excellent agreement with the DLS results for the centrifuged suspension.

In summary, milling with subsequent sedimentation to remove large aggregates, produces a narrow distribution of boron particle sizes between 40 and 60 nm in diameter. The particle shapes are irregular, but with rounded edges. The oleic acid-functionalized particles are soluble, i.e., form stable suspensions, in hydrocarbon solvents such as hexane, and in hydrocarbon fuels such as JP-5, which are complex mixtures, but contain substantial fractions of alkanes and alkenes that appear to interact with the hydrocarbon tails of the oleic acid coating.

Surface Analysis

The surface composition and chemical state was probed by XPS, and the composition results are summarized in Table 1 for un-milled boron, and boron that was milled dry, wetted with hexanes, and wetted with hexanes and oleic acid.

TABLE 1

Summary of surface atomic compositions surface atomic composition (%)

| PE pk | un-milled boron sputter time (s) | | | dry milled sputter time (s) | | | wet milled sputter time (s) | | | milled w/oleic sputter time (s) | | |
|---|---|---|---|---|---|---|---|---|---|---|---|---|
| | 0 | 60 | 360 | 0 | 60 | 360 | 0 | 60 | 360 | 0 | 60 | 360 |
| B 1s | 70.8 | 78.4 | 81.2 | 74.4 | 78.6 | 80.2 | 52.6 | 60.4 | 64.0 | 31.2 | 35.1 | 49.7 |
| O 1s | 11.7 | 9.5 | 8.7 | 12.6 | 10.1 | 8.8 | 29.3 | 23.4 | 20.0 | 13.4 | 9.0 | 5.6 |
| C 1s | 11.9 | 8.0 | 6.5 | 9.7 | 7.2 | 7.0 | 15.3 | 12.4 | 11.6 | 53.1 | 53.2 | 41.0 |
| W 4f | — | — | — | 0.4 | 0.4 | 0.7 | 0.7 | 1.1 | 1.9 | 0.5 | 0.8 | 1.2 |
| Co 2p | — | — | — | 0.4 | 0.5 | 0.6 | 0.7 | 0.8 | 1.2 | 0.2 | 0.1 | 0.1 |
| Fe 2p | — | — | — | 0.1 | 0.2 | 0.2 | 0.2 | 0.3 | 0.3 | 0.2 | 0.2 | 0.2 |
| N 1s | 2.0 | 1.2 | 0.8 | 2.1 | 1.9 | 1.7 | 0.7 | 0.7 | — | 0.4 | 0.4 | 0.4 |
| F 1s | 2.2 | 1.4 | 0.9 | 0.2 | 0.1 | — | 0.5 | — | — | 0.2 | — | — |
| K 2s | 1.2 | 0.8 | 0.6 | — | — | — | — | — | — | — | — | — |
| Ar 2p | — | 0.6 | 1.1 | — | 0.9 | 0.9 | — | 0.9 | 1.1 | — | 0.3 | 1.0 |
| Si 2s | — | — | — | — | — | — | — | — | — | 0.3 | 0.8 | 0.7 |
| Na 1s | — | — | — | — | — | — | — | — | — | 0.3 | 0.1 | 0.1 |

All samples were deposited on the XPS sample holder from hexane suspension, then dried. The samples were analyzed as prepared, and after 1 and 6 minutes of sputtering by 4 keV Ar$^+$ beam rastered across a 2×2 mm region of the surface, centered about the much smaller analysis area. The photoelectron peak used in quantitation is listed in the left hand column, with atomic composition data shown before and after Ar$^+$ sputter treatment. Sputtering removes material from the top surface of the sample, and thus provides some insight into how composition varies with depth.

The atomic compositions were determined from the standard equation:

$$C_x = \frac{I_x/S_x}{\sum I_i/S_i}$$

where $C_x$ is the atomic fraction of a given elemental constituent in a particular sample, $I_x$ is the intensity of the corresponding photoelectron peak, and $S_x$ is the atomic sensitivity factor for that peak in the Kratos instrument. This analysis assumes that the samples are flat and homogeneous over the depth range sampled by XPS (~10 nm), whereas our samples are aggregated powders consisting of elemental boron coated with oxide or oleic acid. A more detailed quantitation model aimed at estimating the oxide layer thickness is described below; however, the simple homogeneous sample model provides a useful starting point.

The un-milled boron spectrum (particle size~800 nm) is dominated by signal from boron, with oxygen, carbon, and various minor contaminants that decrease as the surface is sputtered (the exception is Ar, which increases as more Ar is implanted). The implication is that the un-milled particles have a boron core, with a surface boron oxide layer, and various adventitious contaminants, dominated by carbon, as expected for a sample exposed to the ambient environment. For a monolithic sample, the contaminants would sputter away completely, leaving essentially pure boron. For a powdered sample, however, the oxide and other contaminants are interspersed between particles throughout the sample. There is an initial decrease as the top surface is sputtered clean, but the contaminant level remains high because additional contaminants are exposed as the top layer particles erode away.

Dry milled particles (particle size ~50 nm) should be similar to the un-milled boron, because XPS samples only the top few nm (8-10 nm) of the sample surface, and on this scale the composition should not be strongly affected by reducing the particle size (~40-200 nm). This was observed, with the exception of the appearance of small signals for W, Co, and Fe. The W and Co clearly come from the Co-cemented tungsten carbide milling jar and balls, and the Fe appears to result from iron impurities in the WC. To verify that the WC jar and balls were the source of the Fe contaminant, rather than the hexanes, XPS of two sets of dry-milled powders were compared; one set was washed with hexanes and other set was not. The relative amounts of iron were the same for both samples indicating that WC milling media were the source of the trace amounts of iron.

Such metal contaminants could be undesirable in a fuel system because they might catalyze undesired reactions. The distribution of these metals in the sample was probed by SEM/EDX (energy-dispersive x-ray fluorescence), and it turns out that nearly all the contamination is in the form of a small number of rather large (~200-800 nm) WC particles that were apparently spalled off the WC balls or jar. Because Co-cemented WC is strongly magnetic, it is simple to remove. The particles were simply suspended in hydrocarbon (hexane or JP-5), then cleaned by stirring the liquid using a magnetic stir bar. The magnet was periodically removed, wiped clean with a lint free cloth, and the process was repeated until the magnet appeared clean under visual inspection. XPS analysis of magnetically cleaned samples showed that total W/Co/Fe contamination was reduced to undetectable levels in most samples, and to <1% even for the most heavily contaminated materials.

For the boron wet milled in hexanes, the initial fraction of boron is considerably reduced, and the C and O concentrations are significantly enhanced, compared to dry milled boron. With sputtering, the C and O concentrations decrease and B increases, but even after sputtering to steady state, the C and O concentrations are higher than in the dry-milled material. This might be taken as evidence that wet milling leads to additional oxidation, or possibly formation of a boron carbide on the particle surfaces, but as shown below, high resolution B XPS shows no boron carbide. Without being bound to any particular theory, it appears that the additional carbon and some of the oxygen originates in contaminants in the hexanes (stated purity 99.9% with 0.1% of non-volatiles), which are left behind as a non-volatile residue when the solvent is evaporated to generate the XPS samples.

To determine how much residue might be left behind under conditions used in the XPS sample preparation, 15 ml of the hexanes (the same amount used in wet millings) was evaporated on a piece of clean stainless steel shim stock, and the ratio of the intensities of the C 1s and Fe 2p peaks was measured. This ratio was compared to that found for a clean piece of shim that had not been exposed to hexanes. The normalized, integrated C 1s:Fe 2p intensity ratios were 7.5 and 1.8 for the sample with evaporated hexanes and the control sample respectively. Assuming that the difference in the amount of carbon between these two samples originated from non-volatile residue from the evaporated hexanes, the overlayer thickness of carbon residue coming from the hexanes using a method described in detail below can be estimated. Effective attenuation length (EAL) and photoelectron cross sections for Fe 2p and C 1s were obtained using the NIST EAL database and the X-ray Data Booklet. An estimated overlayer thickness was 2.6 nm of carbon on iron, resulting from contaminants deposited as the hexanes evaporated. Taking into account its higher surface area, the expected residue layer thickness on the powder should be much lower, and that is consistent with the much lower C 1s:B 1s intensity ratio observed for the wet-milled powder. In a fuel application, this contaminant would be insignificant—it is seen in XPS only because the solvent was evaporated, thus concentrating the non-volatiles on the surface, where XPS detects it with high sensitivity. Some of the additional O is XPS signal for the wet-milled boron sample may also originate from oxygenated compounds in the non-volatile residue, but additional insight can be obtained from high resolution XPS, discussed below.

For boron milled in hexanes with oleic acid (washed in MeOH to remove excess oleic acid), the C concentration is over 50%. This is expected because a self-assembled monolayer of oleic acid (18 carbon chain) would be ~2 nm thick. This thick carbonaceous layer not only produces a high intensity of C 1s photoelectrons, but also attenuates the B is photoelectrons coming from the underlying boron. The effective attenuation length (EAL) calculated for B is photoelectrons in a hydrocarbon film is ~3.7 nm,[13] thus a two nanometer thick film would attenuate the signal from boron by ~40%. Note that there is significant Si and Na concentration in this sample. These elements are believed to originate as contaminants in either the oleic acid or the methanol used to wash out the excess acid (both reagent grade), again demonstrating the high sensitivity of XPS to contaminants that deposit on the sample surface during evaporation.

Figure 5:
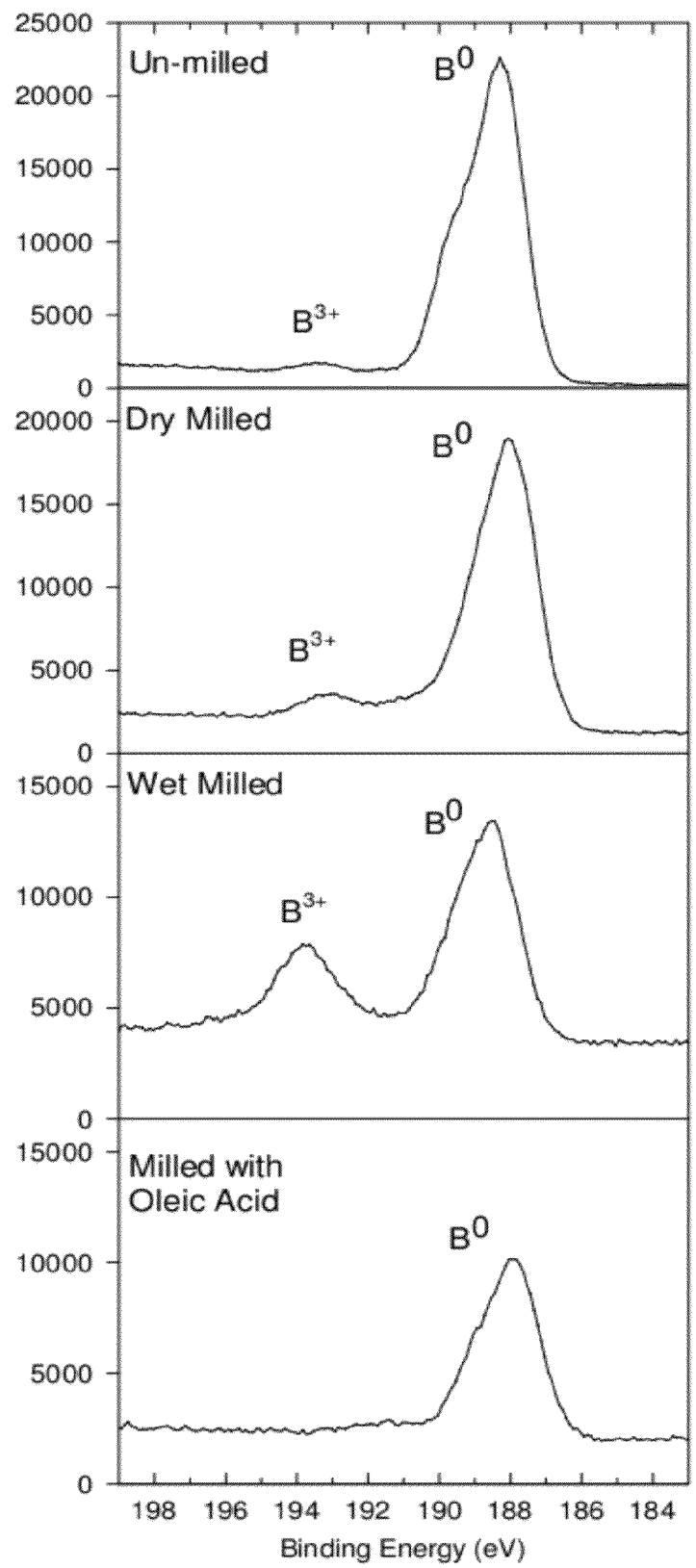
FIG. 5 is a B 1s XPS regional spectra for un-milled, dry milled, wet milled, and milled with oleic acid.

To learn about the chemical state of the particle surfaces, the high resolution B is spectrum was examined. FIG. 5 shows the high resolution B 1s photoelectron spectra for boron that was un-milled, dry-milled, wet-milled, and wet-milled with oleic acid. For each sample, the binding energy scale was corrected using the implanted Ar peak, as outlined above. For those samples with tungsten contamination, the W $4d_{5/2}$, Ar $2p_{3/2}$ and Ar $2p_{1/2}$ peaks overlap, and the Ar 2s peak was used as the reference. There are clearly several components present in the set of spectra, corresponding to different chemical states of boron. The spectra were fit to Gaussian/Lorentzian type functions and results are shown in Table 2.

TABLE 2

Summary of fitting results
B 1s fitting results: powder samples

| | un-milled boron | | dry milled | | wet milled | | milled w/oleic | |
|---|---|---|---|---|---|---|---|---|
| Peak | BE (eV) | int. ratio (pk1/pk2) | BE (ev) | int. ratio (pk1/pk2) | BE (eV) | int. ratio (pk1/pk2) | BE (ev) | int. ratio (pk1/pk2) |
| 1 | 188.0 | 18.3 | 188.0 | 14.6 | 188.5 | 2.6 | 187.9 | 23.6 |
| 2 | 193.3 | — | 193.0 | — | 193.6 | — | 192.0 | — |

Because different samples charge differently (causing changes in peak widths), the fitting procedure was constrained to provide chemical state information that is consistent across the entire set of samples, rather than obtaining the best mathematical fit to each individual spectrum. The XPS-peak program was used to optimize the fits.

It appears that two components, corresponding to two chemical states of boron, are sufficient to account for nearly all the intensity in all samples. The most intense peak for all samples can be identified as that arising from elemental boron (zero oxidation state —$B^0$) from boron at the core of the particles. This peak appears at 187.98 eV for both the un-milled and dry-milled powders, shifting to 188.53 and 187.89 eV for the wet-milled and wet-milled with oleic acid samples, respectively. The variation in $B^0$ peak position and the somewhat variable peak shapes are believed to be an artifact of differential sample charging, which depends on the nature of the sample. In addition to the peak for $B^0$, there is a smaller peak at ~193 eV for the un-milled, dry and wet-milled samples. The literature binding energy for $B_2O_3$ is 193 eV, thus this peak is identified as fully oxidized boron ($B^{3+}$), presumably on the surface of the particles. For the sample wet-milled with oleic acid, there is no obvious oxide peak, but there appears to be a very weak feature around 192 eV. Given the high affinity of boron for oxygen, it is almost certain that the oleic acid binds to the boron surfaces via B—O—C bond formation. Such a bond would formally create boron in a +1 oxidation state, and the chemical shift would be intermediate between that for $B^0$ (~188) and $B^{3+}$ in $B_2O_3$ (~193). For example, the literature reported a B 1s binding energy of 191.5 for a boron suboxide. Note that the overall intensity for this sample is lower than for the others, reflecting attenuation of B 1s electrons passing through the oleic acid overlayer.

The dry-milled, wet-milled and wet-milled-with-oleic-acid samples were produced under identical conditions, and all were exposed to air for similar times after drying. As a result of this analysis, wet-milling without oleic acid leads to substantially increased oxidation, compared to dry-milled or un-milled boron. Wet-milling with oleic acid, on the other hand, leads to undetectable levels of $B^{3+}$ associated with oxide formation, and only the very weak feature attributed to $B^{1+}$ associated with B—O—C bonding to the oleic acid.

It is surprising that the wet-milled particles should have a larger fraction of oxidized boron than dry-milled samples. In considering this effect, it is important to bear in mind that XPS samples the near-surface region, with sensitivity falling off like $\exp^{-(z/EAL)}$, where z is the depth, and EAL is the effective attenuation length of photoelectrons in the solid material (~3 nm, for B 1s electrons). As a result, the XPS intensities can be quite sensitive to sample morphology, as well as composition.

Before considering morphology, there is a question of whether wet-milling might somehow induce additional oxidation during the milling process. There is a possibility that the hexanes used as milling solvent could potentially contain enough dissolved oxygen to account for this much oxide formation. Approximating the particles as 50 nm spherical particles (surface area of 51 m²/g), then forming a 1 nm coating of $B_2O_3$ would require ~0.12 grams of oxygen, for a typical milling batch of 2 g boron. Based on the reported solubility (0.2 mole %)[17] of $O_2$ in n-hexane at room temperature, it is clear that no more than a few percent of the oxide might be attributed to $O_2$ in the hexanes. This conclusion was tested by milling a batch of boron with pentane distilled under $N_2$, and no decrease in the $B^0/B^{3+}$ XPS intensity ratio was observed. Similarly, other potential oxygen sources such as an oxide film on the milling jar/ball surfaces can be discounted because they simply cannot contain nearly enough oxygen to account for the level of boron oxidation observed.

The other difference between our wet-milling and dry-milling procedures is that the wet-milled particles are first exposed to oxygen by bubbling a variable $N_2/O_2$ mixture through a suspension in hexanes, whereas dry-milled powder is exposed to the variable $N_2/O_2$ mixture dry. Whether the bubbling process somehow increased the extent of oxidation was tested by suspending dry-milled powder in hexanes and using the same bubbling procedure that was used for wet-milled powder. The oxide concentration seen in XPS was identical to that for dry-milled material never exposed to hexanes.

It appears, therefore, that upon air exposure, wet-milled boron forms an oxide layer that appears thicker to XPS than dry milled boron, and the most likely explanation is that the powder morphology is different. A study of the oxide layer formed on a roughly flat surface of polycrystalline boron was also made. In that case, the oxide growth is self-limiting at 0.7-1 nm thickness, depending on air exposure time. For smooth nanoparticles larger than 50-100 nm in size, i.e., much larger than both the oxide layer thickness and the XPS sampling depth, the $B^0/B^{3+}$ XPS ratio should be similar to that for a flat surface because XPS is mostly seeing the top surface of the particles. As discussed below, the apparent oxide layer thickness is increased due the fact that the particle surfaces are not all normal to the electron detection axis, but for smooth particles, this is only on the order of a 10% correction. Both dry-milled and un-milled boron powders exposed to air do look similar to flat boron in XPS, suggesting that these samples contain only relatively large particles.

The fact that the wet-milled samples have significantly greater XPS-apparent oxide layer thickness, therefore, results from one of two effects. It could be that wet milling somehow changes boron oxidation chemistry and bulk diffusion, such that growth of the native oxide layer self-limits at ~3 nm (the apparent oxide thickness), rather than 1 nm. Exposure to hexanes under milling conditions may modify the surface oxidation rate, but it seems implausible that simple hexane exposure on the surface would modify the diffusion behavior to 3 nm depth.

The alternative explanation is that wet-milled boron has a different morphology than dry-milled or unmilled boron. A significant difference in particle morphology may be due to the effect that wet milling reduces the particle size twice as fast as dry milling. For example, if particles produced by wet-milling have surface asperities on the 1-5 nanometer scale, or if the wet-milled samples contain some fraction of ultrafine (<5 nm) particles, then for a 1 nm oxide layer, the fraction of oxide visible in the XPS sampling depth (~8-10 nm) would be substantially higher than for large particles with relatively smooth surfaces. Neither ultrafine particles, nor nanometer scale asperities would be detectable with the above SEM resolution, however, the absence of small particle signal in the DLS is, perhaps, support for the surface asperity scenario.

Regardless, boron that was wet milled with oleic acid shows essentially no signal for boron oxide, indicating that the surfaces are completely protected from oxidation, aside from the oxygen in the B—O—C bonds that anchor the ligand to the surface. These particles were milled under identical conditions, and otherwise treated identically to the wet-milled samples, and as far as can be told by SEM the particle size distributions are similar for wet milling with, and without oleic acid. Therefore, the oleic acid binds efficiently to fresh unoxidized boron surfaces as they are produced by crushing larger particles, and provides an effective barrier to air-oxidation at temperatures up to at least ~70° C. (the drying oven temperature).

The Nature of the Oxide Layer on Bulk and Nanoparticle Boron:

Since, to date, there have been few studies which have looked the oxide layer formed by air-oxidation of boron surfaces, the following XPS experiment was performed to aid interpretation of the powder experiments. Two small pieces of boron (~3×2×1 mm) were prepared for surface analysis. One sample had been exposed to ambient air for years, and a fresh surface was prepared on the other sample by cleaving the sample just prior to introduction into the load lock chamber of the analysis instrument. The time that the freshly cleaved surface was exposed to the ambient atmosphere was on the order of a few minutes, needed for sample mounting. Table 3 summarizes B 1s XPS of the two samples.

TABLE 3

Fitting results for flat bulk boron surface analysis
B 1s fitting results: bulk samples

| peak | bulk boron BE (eV) | bulk boron int. ratio (pk1/pk2) | bulk boron "clean" BE (eV) | bulk boron "clean" int. ratio (pk1/pk2) |
|---|---|---|---|---|
| 1 | 188.1 | 6.5 | 188.2 | 12.9 |
| 2 | 193.4 | — | 193.4 | — |

Peak 1 corresponds to un-oxidized $B^0$ and peak 2 is identified as $B^{3+}$ in $B_2O_3$, and the peak intensities were determined using the same fitting procedure used with the powder samples. The cleaved sample showed about half the ratio of $B^{3+}$ to $B^0$ peak intensity, compared to the sample exposed for years, indicating that the initial oxide layer growth is rapid, but that formation of the fully self-limiting native oxide layer takes more than a few minutes at room temperature. Note, also, that the binding energies are somewhat different in these bulk samples, compared to the nanopowder samples. The differences are attributed to a greater extent of charging on the thick bulk samples.

To determine the thickness of the oxide layer from the $B^0/B^{3+}$ intensity ratios, it is necessary to model the XPS process. Samples were assumed to consist of a uniform $B_2O_3$ coating on top of a thick, flat elemental boron solid. Starting from a depth much greater than the escape depth of B is photoelectrons, the sample was represented by a series of layers, much thinner than any feature expected in the real sample. The deeper layers are assumed to be pure boron, switching to $B_2O_3$ at a depth corresponding to the assumed oxide layer thickness. In each layer, B is photoelectrons are generated with kinetic energies appropriate to either B or $B_2O_3$ and intensities proportional to the atomic density of B in that layer. These electrons are added to electrons coming from the layer below, and passed to the layer above with the appropriate attenuation factor: $\exp(-L_{thick}/EAL)$, where $L_{thick}$ is the layer thickness, and EAL is the effective attenuation length for B 1s photoelectrons in either B or $B_2O_3$, depending on the composition of that layer. The process is repeated until the surface of the model sample is reached, at which point the ratio of electrons from B and $B_2O_3$ leaving the sample can be calculated. The assumed thickness of the oxide layer is varied until the calculated and experimental ratios are in agreement. EAL values for the B is photoelectrons (KE=1298 eV) in boron and boron oxide were calculated using the NIST Electron Effective Attenuation Length database program and are 2.90 and 3.14 nm, respectively.

The modeling indicates that the oxide layer on the sample exposed for years (the fully developed native oxide) is 0.96 nm, while the sample exposed for only a few minutes has an oxide thickness of 0.71 nm. Clearly, oxidation is quite fast, with oxide layer thickening to ~70% of the limiting native oxide thickness in just a few minutes. Clearly, any strategy to avoid oxide formation must passivate the surfaces before any significant oxygen exposure occurs.

XPS intensity modeling can also be applied to the powder samples, however, because the powder surfaces are rough, unambiguous quantitation of surface oxide thickness is not possible. Two effects are of interest. As discussed above, surface asperities or ultrafine particles with sizes less than the XPS sampling depth (~8-10 nm) will lead to more oxide in the XPS-visible region of the sample, and without knowledge of the structure on this scale, modeling is not possible. The other effect that can be modeled is the effect of surface curvature on the scale of the particles sizes observable in SEM and DLS, ~50 nm. The major effect expected for particles on the 50 nm scale is that there is a distribution of the orientation angle of the local surface normal with respect to the electron detection direction (i.e., a distribution of "take-off" angles). For a given oxide layer thickness, the apparent thickness increases as the takeoff angle increases, because the path length through the oxide layer increases. To examine the magnitude of this effect a model was constructed consisting of close-packed hemispheres of 50 nm diameter covered by a uniform layer of boron oxide. Of course, the actual sample surface (see FIG. 1) resembles a jumbled pile of angular particles; however, the hemisphere model should capture the average effect of randomly oriented surfaces.

For this model, where the particle size is much larger than the electron escape depth, and much smaller than the x-ray penetration depth, the effect is similar to what is observed in angle resolved x-ray photoelectron spectroscopy (ARXPS), where an increase in the tilt angle of a sample leads to a corresponding increase in the measured signal from overlayer species. Thus, the appropriate angle-weighted average can be used. It turns out that the effect is small—the apparent oxide layer thickness is only ~10% greater than that for a flat surface. Therefore, as discussed above, the larger $B^{3+}:B^0$ ratio for wet-milled boron, compared to the unmilled or dry-milled samples, can be attributed to an increase in the concentration of surface asperities, or possibly to ultrafine particle, not seen in the DLS. In either case, with oleic acid, the particles are protected, whatever their size/shape.

Fuel-soluble boron nanoparticles were successfully produced using a simple one step synthesis method. Ball milled powders were produced with a bi-modal size distribution with components peaked at ~50 and 600 nm respectively as shown by DLS and SEM measurements. The components were easily separable, leaving behind only a narrow size distribution peaked at 50 nm. In addition to being fuel soluble, XPS data revealed that the nanoparticles were un-oxidized potentially improving combustibility. Thus, formation of un-oxidized air-stable boron nanoparticles, and of hydrocarbon-soluble boron nanoparticles was demonstrated.

Example 2

Ceria and Oleic Acid Coated Boron

The same basic procedures and testing were performed as for Example 1, except as described below. To generate ceria-coated particles, a two step process was used. In the first step, 2 g boron and 0.1 g $CeO_2$ (Nano-Scale Materials Inc., 120 nm diameter) were dry milled with 160 grams of WC balls for 30 minutes, to allow the two solids to interact without intervening ligand or wetting agent. As shown below, this results in bonding of patches of ceria to the boron surfaces. After this initial dry phase, the jar was opened in a $N_2$ atmosphere, and 15 ml of hexanes and 1 ml of oleic acid were added. The sample was then wet milled for an additional 2.5 hours, followed by the same work-up as in the wet milling process as described above. The ceria-coated particles are also quite dispersible in hydrocarbon solvents, and can be methanol-washed and handled much like pure boron milled with oleic acid. Presumably, oleic acid binds via B—O—C linkages to the regions of the particles that are not covered by ceria. In addition, ceria milled with oleic acid is also quite dispersible in hydrocarbons, indicating that oleic acids bind to ceria as well, apparently by hydrogen bonds.

Figure 6:
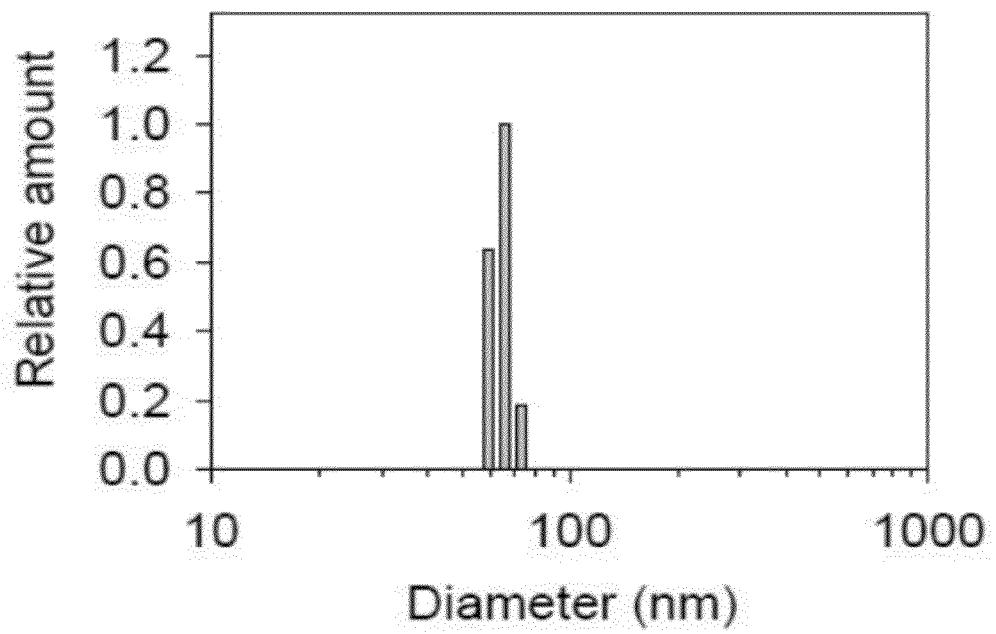
FIG. 6 is a graph of DLS size distribution of ceria coated boron functionalized with oleic acid (peaked at 66 nm).

The size distributions for boron milled with ceria, as determined by DLS, are essentially identical to those obtained without ceria, under the same milling conditions (see FIG. 6). The coating morphology and chemical state of the ceria and boron in these samples are catalytically important properties.

XPS for Boron Milled with Ceria.

Figure 7:
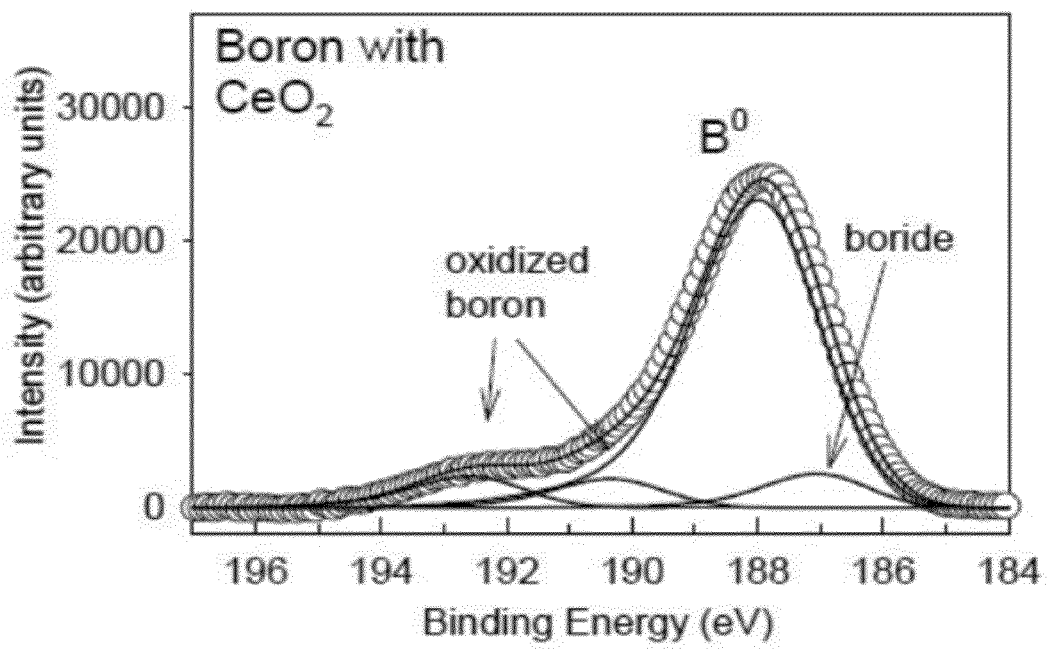
FIG. 7 is a B 1s spectra taken from boron powders that were milled dry with ceria.

FIG. 7 shows the B 1s spectra taken from boron powders that were milled dry with ceria. Data for wet-milled B/ceria samples that were functionalized with oleic acid were also obtained, however, the oleic acid coating attenuates the signal significantly, and it is easier to see the smaller features in the dry-milled sample. Particles milled in this manner were also found to be soluble in hydrocarbons, and separate experiments done by milling only $CeO_2$ with oleic acid demonstrated that $CeO_2$ is also easily functionalized with oleic acid. When constraining the fit component peak shapes, as above, it is necessary to use four components peaking at 187.2, 188.0, 190.3, and 192.6 eV to obtain a reasonable fit. The main component (188.0) is clearly $B_0$ from the particle core and 192.6 is assigned to $B^{3+}$ in the oxide layer. The component at 190.3 eV may represent some slightly oxidized boron formed at the ceria-boron interface, but it might also be an artifact of differential charging of the ceria-coated particles. An interesting feature is the asymmetric broadening to low binding energy of the main peak, compared to that in boron dry milled without ceria. This feature was fit well by adding a small peak at 187.2 eV. It is possible that this component also results from differential charging which can induce peak asymmetry; however this effect was only seen for samples milled with $CeO_2$, despite significant charging for all samples. The other possibility is formation of a cerium-boride, i.e., chemical interaction at the ceria-boron interface. Cerium forms stable borides, with the most common stoichiometries being $CeB_4$ and $CeB_6$. Such borides result in XPS peaks that are typically shifted between about 1.8 and 0.1 eV to lower binding energy, compared to $B_0$. The only other boron compounds with B XPS peaks shifted to lower binding energies are species such as boranes and $NaBH_4$ which would not be expected to form under our milling conditions. Considering that the low binding energy feature is only seen for samples where boron was milled with ceria, it can be attributed to formation of some $B_xCe_yO_z$ compound at the boron-ceria interface. Regardless, the point here is that the XPS provides evidence that the ceria is chemically bonded to the boron particle surfaces.

STEM/EDX Anaylsis of Ceria-Coated Boron Nanoparticles.

Figure 8:
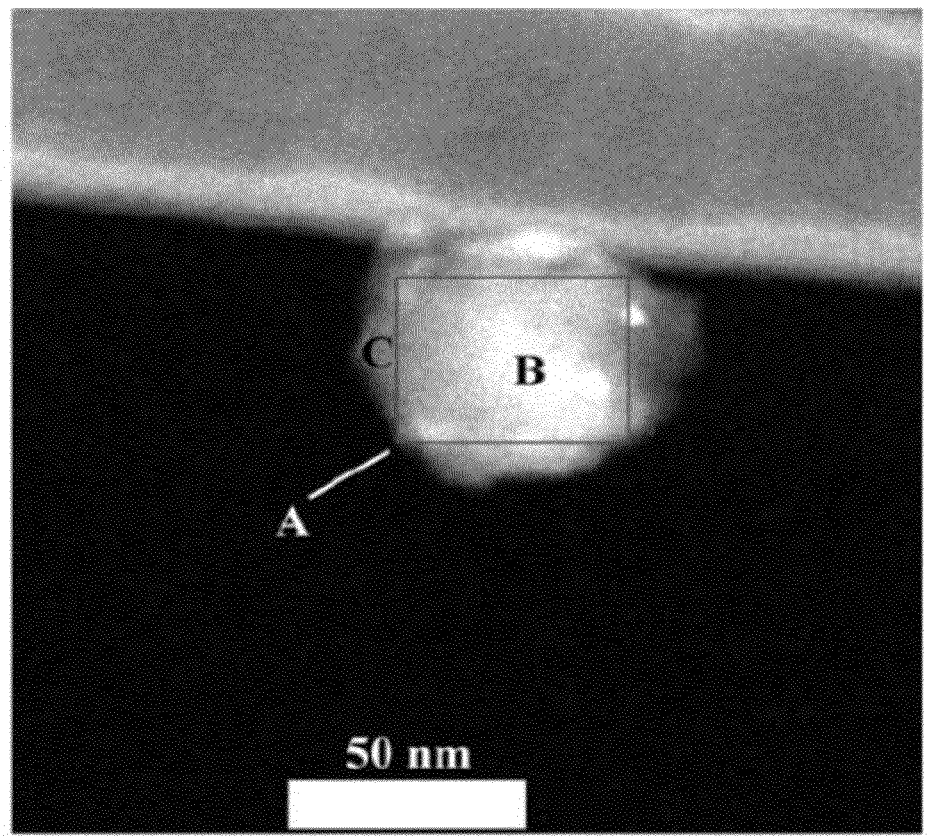
FIG. 8 is an STEM image of a typical ~50 nm primary (i.e., non-aggregated) particle produced by dry-milling of boron with as-received ceria for 6 hours.

Further morphology information was obtained through small spot EDX analysis coupled with STEM/HAADF images. FIG. 8 shows a STEM image of a typical ~50 nm primary (i.e., non-aggregated) particle produced by dry-milling of boron with as-received ceria for 6 hours, as discussed above.

Figure 9:
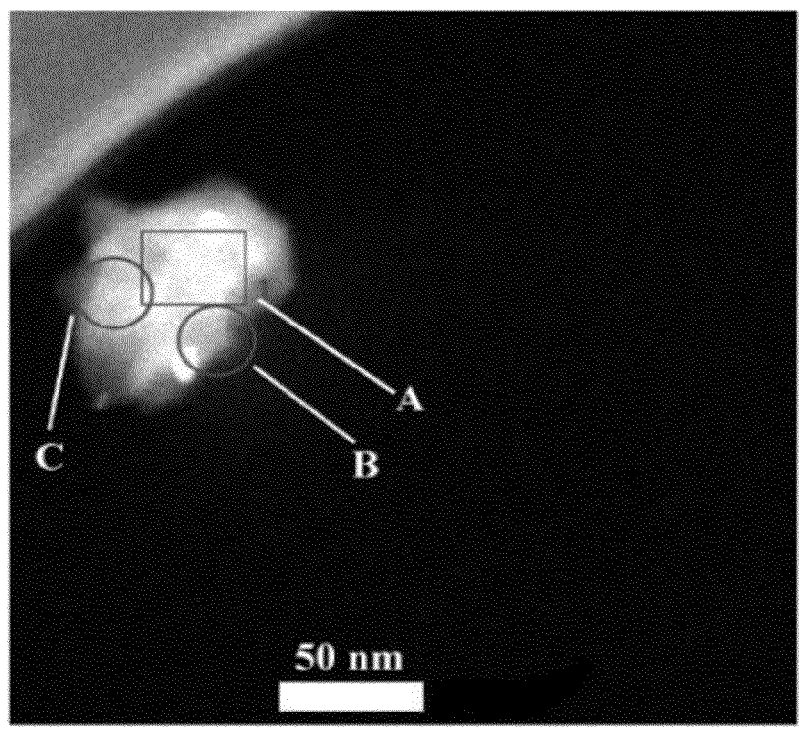
FIG. 9 is an additional STEM/HAADF image of ceria coated boron particles.

To avoid sample bias, several particles were analyzed with similar results. An example of one such particle is presented as FIG. 9. Superimposed on the image are a rectangle labeled "A" and two circles labeled "B" and "C" that indicate areas probed for the EDX atomic composition analysis summarized in Table 4.

TABLE 4

EDX results boron milled with ceria
EDX atomic composition

| | area A | | | area B | | | area C | |
|---|---|---|---|---|---|---|---|---|
| element | atomic % | weight % | element | atomic % | weight % | element | atomic % | weight % |
| B | 27.8 | 23.0 | B | 30.4 | 26.1 | B | 37.4 | 33.0 |
| Ce | 0.2 | 1.8 | Ce | 0.2 | 2.1 | Ce | 0.0 | 0.3 |
| O | 4.8 | 5.8 | O | 2.5 | 3.2 | O | 1.1 | 1.5 |
| C | 65.4 | 60.3 | C | 65.7 | 62.7 | C | 60.2 | 59.0 |
| Cu | 1.9 | 9.0 | Cu | 1.2 | 5.9 | Cu | 1.2 | 6.2 |

The particles in this sample typically have brighter and darker patches randomly distributed over their surfaces. With the HAADF detector, brighter areas in the images correspond to regions that are either thicker, or that contain higher concentrations of high Z elements (Ce). The first column ("area A") shows analysis over the large rectangular area, covering much of the particle surface, and taking in a cluster of large bright spots near the center. Boron, oxygen, and cerium are present, along with copper and a large amount of carbon. All of the copper, and most of the carbon, results from the Cu-supported carbon TEM grid that the particles are deposited on. Analysis of area "B", which is centered on a bright patch on the particle, shows somewhat higher Ce concentration than in the large area, but "area C", which focuses on a dim area in the image, is almost free of Ce. These results show that the bright areas covering the surface are Ce-rich, and dim areas are essentially Ce-free boron, with roughly 20% of the particle surface coated (a transmission image shows a projection of bright areas on both the top and bottom surfaces of the particles).

An uneven coating of ceria on the boron particle surfaces is expected. The boron particles are rough, and the milling process would not be expected to generate a uniform coating. In fact, for a fuel application, such a partial coating may be desirable, because a complete coating of ceria on the boron surface would tend to inhibit ignition/combustion of the boron.

Formation and Thickness of the Boron Native Oxide Layer.

Therefore, formation of the oxide formed under ambient conditions on both nanoparticles and a flat surface of bulk boron were studied. To generate an approximately flat surface of solid boron, a solid ~5 cm piece of polycrystalline 11B grown by chemical vapor deposition by Eagle-Pitcher in the early 1990s was used. In experiments using these pieces as laser vaporization targets for gas-phase cluster chemistry studies, it was found that once the surface oxide was vaporized (in vacuum) the bulk of the pieces were largely oxide free. For the present experiment, the large piece was shattered just prior to introduction into the XPS vacuum system. Two fragments, each roughly 3×2×1 mm, were used. One was mounted to expose the freshly cleaved surface, and the other to expose a flat section of the original outside surface. Thus, one surface had only a few minutes exposure to the ambient air, and the other represented a surface with years of air exposure.

The result was that the oxide layer on the sample exposed for years was found to be 0.5 nm thick, while the sample exposed for only a few minutes has an oxide thickness of 0.4 nm. $Ar^+$ sputter cleaning was used to remove the oxide layers, allowing examination of the oxidation level of the interior of the samples. Internal levels of oxidation were found to be negligible. Thus, oxidation is quite fast, with the oxide layer thickening to ~80% of the limiting native oxide thickness in just a few minutes. Therefore, any strategy to avoid oxide formation must passivate the surfaces before any significant oxygen exposure occurs.

As shown in FIG. 5, the oleic-acid functionalized nanoparticles are essentially free of any $B_2O_3$ layer, within the sensitivity of XPS. The unmilled boron has a $B^0/B^{3+}$ intensity ratio similar to that for flat, bulk boron tested above, and use of the "flat layered" model results in a 0.5 nm oxide layer. This similarity to flat bulk boron is expected because the unmilled boron particles are ~100 times larger than the 8-10 nm probe depth of XPS, and therefore should look flat to XPS.

Clearly, however, the dry-milled, and especially the wet-milled boron has substantially more XPS-visible oxide. A likely cause of the greater apparent degree of oxidation is the morphology of the nanopowder, and there are two major effects expected. For smooth particles with a thin oxide overlayer, the curvature of the particle surface results in an increase in the XPS signal from the overlayer, because of the variation in the angle between the local surface normal and the XPS detection direction ("take-off" angle). As noted above, photoelectron intensity from the underlying boron particle core is attenuated by passage through the oxide overlayer: $I=I_0 exp(-t/EAL)$. For flat surfaces oriented with zero take-off angle, i.e., with the surface normal along the XPS detection direction, t is simply the overlayer thickness. For a surface with take-off angle $\theta$, the photoelectrons from the boron core must penetrate through oxide for a distance $t/\cos\theta$, resulting in more attenuation of the $B^0$ signal. Because the oxide layer has a greater effective thickness along the detection direction, there is also additional $B^{3+}$ signal, resulting in a significant drop in $B^0/B^{3+}$ intensity ratio that gives the appearance of a thicker oxide coating. For example, if the dry-milled sample is modeled assuming a flat surface (flat layered model, supporting information), the best fit oxide layer thickness is 0.7 nm, compared to 0.4 nm for the cleaved, flat boron sample.

This geometric effect has been simulated using a "random packed spheres" model. In essence, the sample (a thick layer of nanoparticles) was modeled by a collection of randomly packed spheres with variable diameter (set to 50 nm), each coated with a uniform oxide layer of adjustable thickness. Of course the actual particles are not spherical, however, a collection of randomly oriented angular nanoparticles should give a distribution of take-off angles similar to that of spherical particles. The oxide layer thickness that best fits the dry-milled data with this model is 0.4 nm—identical to that seen for the cleaved, flat boron sample. Therefore, the additional $B^{3+}$ intensity seen in XPS of dry-milled boron, relative to bulk boron, can be attributed largely to this surface curvature effect.

The wet-milled (without oleic acid) sample has far more B3+ signal than can be reasonably rationalized by sample curvature. For example, modeling this sample with 50 nm randomly packed spheres, the resulting oxide layer thickness is 1.7 nm—over 4 times the native oxide layer thickness for flat or dry-milled boron. Either something about the wet-milling process substantially enhances the tendency of the particles to oxidize upon air exposure, or the morphology is not adequately represented by uniform spherical particles.

It was possible that the hexanes used as milling solvent could potentially contain enough dissolved oxygen to oxidize the particles during milling. For 50 nm spherical particles (surface area of 51 $m^2/g$), forming a 1 nm coating of $B_2O_3$ would require ~0.12 grams of oxygen, for a typical milling batch of 2 g boron. Based on the reported solubility (0.2 mole %) of $O_2$ in n-hexane at room temperature, it is clear that no more than a few percent of the "extra" oxide could conceivably be attributed to $O_2$ in the hexanes. This conclusion was confirmed by the observation of similar levels of oxide formation for boron milled using pentane distilled under $N_2$ as the wetting agent. Similarly, other potential oxygen sources such as an oxide layer on the milling jar/ball surfaces can be discounted because they simply cannot contain nearly as much oxygen as was observed in the wet-milled samples. Another difference between the wet- and dry-milling procedures was that the wet-milled particles were initially exposed to oxygen by bubbling a variable $N_2/O_2$ mixture through a suspension in hexanes, while dry-milled powder was usually exposed to the variable $N_2/O_2$ mixture dry. Testing was performed to see if the bubbling process somehow increased the extent of oxidation, by suspending dry-milled powder in hexanes and using the same bubbling procedure that was used for wet-milled powder. The oxide concentration seen in XPS was identical to that for dry-milled material never exposed to hexanes.

Therefore, the wet-milled boron really does form more XPS-visible oxide than dry-milled boron, when exposed to air. Morphology differences on the few nanometer scale were explored using high resolution transmission electron microscopy (HRTEM) on the dry- and wet-milled samples. The edge delineating the boron mass from the underlying support is rougher in the case of the wet milled sample than the dry milled sample. Several particles in each sample were examined, and the trend seems to be that the wet-milled boron is somewhat rougher than the dry-milled boron, resulting in higher levels of oxidation.

The oleic acid binds covalently to fresh, unoxidized boron surfaces as they are produced by crushing larger particles, and provides an effective barrier to air-oxidation at temperatures up to at least ~70° C. (the drying oven temperature).

CONCLUSIONS

Fuel soluble, oleic acid-functionalized boron nanoparticles, with and without $CeO_2$, were successfully produced using a simple one step synthesis method. Ball milled powders were produced with a bi-modal size distribution with components peaked at ~50 and 600 nm respectively as shown by DLS and SEM measurements. The components were easily separable; leaving behind only a narrow size distribution peaked at 50 nm, which forms stable colloidal solutions in hydrocarbon solvents and jet fuels. In addition to being fuel soluble, XPS data revealed that the ligand protected nanoparticles were un-oxidized; a major step in the development of the use of boron as a potential fuel additive. Combustion testing of boron and ceria/boron nanoparticles dispersed in hexanes and dodecane, and have shown significant increases in both flame temperature and total heat production.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. An air-stable coated particle, comprising an oxidizable core having an organic ligand coating substantially encompassing the oxidizable core, said oxidizable core consist essentially of boron, and said coated particle being substantially free of an oxide of the oxidizable core, and said organic ligand coating is selected from the group consisting of oleic acid, stearic acid, maleic acid, sodium dodecyl sulfate, trioctyl phosphate, organic amines, organic nitriles, organic isonitriles, organic fatty acids, linoleic acid, behenic acid, organic alkyl amines, organic alcohols, organic fluorocarbons, organic amides, organic sulfonates, ionic liquids, and combinations thereof.

2. The coated particle of claim 1, wherein the organic ligand coating is non-polar.

3. The coated particle of claim 1, wherein the organic ligand is oleic acid.

4. The coated particle of claim 1, wherein the organic ligand is a fluorinated ligand.

5. The coated particle of claim 1, wherein the organic ligand coating is polar.

6. The coated particle of claim 1, wherein the organic ligand is covalently attached to the oxidizable core.

7. The coated particle of claim 1, wherein the coated particles are soluble in binders of rocket propellants.

8. The coated particle of claim 1, further comprising at least one discrete combustion catalyst island on the oxidizable core between the organic ligand and the oxidizable core.

9. The coated particle of claim 8, wherein the combustion catalyst is selected from the group consisting of cerium oxide, palladium oxide, tin oxide, manganese oxide, yttrium oxide, iron oxide, cobalt oxide, palladium, platinum, nickel, and composites, intermetallics, alloys thereof, and combinations thereof.

10. The coated particle of claim 1, wherein the coated particle is a nanoparticle.

11. An enhanced fuel comprising a fuel having the coated particles of claim 1 dispersed therein.

12. The enhanced fuel of claim 1, wherein the fuel is jet fuel or a solid propellant.

13. The coated particle of claim 1, wherein the organic ligand coating is attached to a surface of the oxidizable core.

* * * * *